(12) United States Patent
Schvey et al.

(10) Patent No.: US 11,829,494 B2
(45) Date of Patent: *Nov. 28, 2023

(54) DISTRIBUTED PRIVATELY SUBSPACED BLOCKCHAIN DATA STRUCTURES WITH SECURE ACCESS RESTRICTION MANAGEMENT

(71) Applicant: Schvey, Inc., New York, NY (US)

(72) Inventors: Jeffrey Schvey, New York, NY (US); Nadi Sarrar, New York, NY (US)

(73) Assignee: Schvey, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,952

(22) Filed: May 4, 2021

(65) Prior Publication Data

US 2021/0350010 A1 Nov. 11, 2021

Related U.S. Application Data

(63) Continuation of application No. 15/996,057, filed on Jun. 1, 2018, now Pat. No. 11,030,331.

(Continued)

(51) Int. Cl.
*G06F 21/62* (2013.01)
*H04L 29/06* (2006.01)
(Continued)

(52) U.S. Cl.
CPC ........... *G06F 21/62* (2013.01); *G06F 21/40* (2013.01); *G06F 21/645* (2013.01);
(Continued)

(58) Field of Classification Search
CPC ..... G06F 21/62; H04L 9/0637; H04L 9/0643; H04L 63/04; H04L 63/10; H04L 63/123; H04L 9/50
See application file for complete search history.

(56) References Cited

U.S. PATENT DOCUMENTS

| | | | |
|---|---|---|---|
| 10,979,229 | B2 | 4/2021 | Litsios et al. |
| 2017/0111175 | A1 | 4/2017 | Oberhauser et al. |

(Continued)

FOREIGN PATENT DOCUMENTS

| | | |
|---|---|---|
| CN | 106778343 A | 5/2017 |
| CN | 106796685 A | 5/2017 |
| CN | 106796688 A | 5/2017 |

OTHER PUBLICATIONS

Office Action in related Singapore application 11201911366V dated Jan. 6, 2022, pp. 1-6.

(Continued)

*Primary Examiner* — Phy Anh T Vu
(74) *Attorney, Agent, or Firm* — Pillsbury Winthrop Shaw Pittman, LLP

(57) ABSTRACT

Disclosed herein is a system for providing a cryptographic platform for distributing data structures within a peer-to-peer network wherein encrypted messages are exchanged among nodes. The system provides for the creation and management of privately subspaced blockchains that include subspaces that are private, yet verifiable through the use of global state roots. The global state roots are updated based on subspace roots that are in term generated based on the data in that subspaces.

20 Claims, 34 Drawing Sheets

Related U.S. Application Data

(60) Provisional application No. 62/513,773, filed on Jun. 1, 2017.

(51) Int. Cl.

| | | |
|---|---|---|
| *G06F 21/64* | (2013.01) | |
| *G06F 21/40* | (2013.01) | |
| *H04L 9/32* | (2006.01) | |
| *H04L 9/06* | (2006.01) | |
| *H04L 9/40* | (2022.01) | |
| *G06Q 20/22* | (2012.01) | |
| *G09C 1/00* | (2006.01) | |
| *G06Q 20/38* | (2012.01) | |
| *H04L 9/00* | (2022.01) | |

(52) U.S. Cl.
CPC ......... *G06Q 20/223* (2013.01); *G06Q 20/389* (2013.01); *G06Q 20/3823* (2013.01); *G09C 1/00* (2013.01); *H04L 9/0637* (2013.01); *H04L 9/0643* (2013.01); *H04L 9/3236* (2013.01); *H04L 63/04* (2013.01); *H04L 63/10* (2013.01); *H04L 63/123* (2013.01); *H04L 9/50* (2022.05); *H04L 63/061* (2013.01); *H04L 2209/56* (2013.01)

(56) References Cited

U.S. PATENT DOCUMENTS

| | | | | |
|---|---|---|---|---|
| 2018/0349621 | A1* | 12/2018 | Schvey | G06F 21/645 |
| 2019/0081793 | A1* | 3/2019 | Martino | H04L 9/0894 |
| 2019/0109707 | A1* | 4/2019 | Ajoy | H04L 9/0637 |
| 2019/0140822 | A1 | 5/2019 | Xie et al. | |
| 2019/0220813 | A1* | 7/2019 | Madisetti | G06Q 20/405 |
| 2019/0238550 | A1 | 8/2019 | Zhang et al. | |
| 2019/0349343 | A1* | 11/2019 | Gollogly | H04L 9/50 |
| 2019/0384927 | A1* | 12/2019 | Bhatnagar | G06F 21/602 |
| 2020/0137154 | A1* | 4/2020 | Wu | G06F 16/1834 |
| 2020/0167367 | A1* | 5/2020 | Zhuo | G06F 16/2246 |
| 2020/0322159 | A1* | 10/2020 | Xu | H04L 9/3236 |
| 2021/0099283 | A1* | 4/2021 | Schvey | G06F 9/45508 |

OTHER PUBLICATIONS

Office Action in related Japanese application 2019-565855 dated Jan. 25, 2022, pp. 1-4.

Quorum Whitepaper, Nov. 23, 2016, https://github.com/ConsenSys/quorum-docs/commit/e8254a7e83ab019351a2bf6da67442b4dcc791c8.

Loi Luu et al., A Secure Sharding Protocol For Open Blockchains, CCS'16: Proceedings of the 2016 ACM SIGSAC Conference on Computer and Communications Security, Oct. 24, 2016, pp. 17-30, https://dl.acm.org/doi/10.1145/2976749.2978389.

Chinese Office Action in related Chinese application 201880046433.7 dated Mar. 18, 2022, 11 pages.

"Quorum Whitepaper", https://github.eom/ConsenSys/quorum-docs/blob/master/Quorum%20Whitepaper%20v0.I.pdf, "github", 20161123, Nov. 23, 2016.

Luu, Loi, A Secure Sharding Protocol fro Open Blockchains, Proceedings of the 2016 ACM SIGSAC Conference on Computer and Communications Security, Oct. 24, 2016.

Search Report and Written Opinion in related SG Application No. 11201911366V dated Mar. 30, 2021.

Github, "Quorum Whitepaper,"Nov. 22, 2016, pp. 1-4 https://raw.githubusercontent.com/ConsenSys/quorumdocs/master/Quorum%20Whitepaper%20v0.1.pdf.

European Office Action in related European Application 18 733 990.8 dated Jul. 18, 2022, pp. 1-4.

Wagstaff, Jeremiah, The subspace white paper—Subspace: A decentralized database of edge devices. Jun. 12, 2018 (date retreived Apr. 24, 2023). https://subspace.github.io/paper/.

Boneh et al., Function-Private Subspace-Membership Encryption and Its Applications, Advances in Cryptology—ASIACRYPT '13, pp. 255-275, 2013.

Office Action for related Korean Patent Application 10-2020-7000108 dated Oct. 30, 2022, pp. 1 to 8, including English Translation.

Final Office Action for related Japanese Patent Application 2019-565855 dated Nov. 1, 2023, pp. 1 to 7, including English Translation.

Notice of Grant for related Chinese Patent Application 201880046433.7 dated Jan. 5, 2023, pp. 1 to 4, including English translation.

\* cited by examiner

| | 104 Core Module | | | 106 Database Module |
|---|---|---|---|---|
| | Validating Node | Peer Node | Service Node | Enterprise Database |
| Icon | ◯ 202 | ◯ 204 | ▭ 206 | EDB 208 |
| Data Access | • Access to all subspaces for which the node is permissioned | • Access to all subspaces for which the node is permissioned | • Access to limited set of contracts within certain subspaces | • Access to all subspaces for which the node is permissioned |
| Key Function | • Receives and relays all messages<br>• Commits messages to blocks on the ledger | • Receives and relays all messages<br>• Provides access to external systems<br>• Does not commit messages to the ledger | • Received and relays a limited number of messages<br>• Receives all messages in common subspace | • Synchronizes with node and stores contract information for rapid retrieval<br>• Provides for more complex data queries and analytics<br>• Provides multiple database sync alternatives |

FIG. 2

Subspace Validation Mapping

| Subspace | A Nodes | B Nodes | C Nodes |
|---|---|---|---|
| 1400 AB | A0, A1 | B0, B1 | |
| 1402 AC | A0, A1 | | C0, C1 |
| 1404 BC | | B0, B1 | C0, C1 |
| 1406 Common | A2 | B2 | C2 |
| 1408 A only | A0, A1, A2 | | |
| 1410 B only | | B0, B1, B2 | |
| 1412 C only | | | C0, C1, C2 |

- Since >50% of votes are required for quorum, less than three nodes is sub-optimal. For instance, the two node scenario would require both to vote identically and increases the risk of failure

FIG. 14

DISTRIBUTED PRIVATELY SUBSPACED BLOCKCHAIN DATA STRUCTURES WITH SECURE ACCESS RESTRICTION MANAGEMENT

RELATED APPLICATIONS

This application is a continuation of U.S. patent application Ser. No. 15/996,057 filed on 1 Jun. 2018, titled DISTRIBUTED PRIVATELY SUBSPACED BLOCKCHAIN DATA STRUCTURES WITH SECURE ACCESS RESTRICTION MANAGEMENT, which claims priority to U.S. Provisional Patent Application Ser. No. 62/513,773 filed on Jun. 1, 2017, titled DISTRIBUTED PRIVATELY SUBSPACED BLOCKCHAIN DATA STRUCTURES WITH SECURE ACCESS RESTRICTION MANAGEMENT. The entire content of each aforementioned patent filing is hereby incorporated by reference.

FIELD OF THE INVENTION

The present invention relates generally to privately subspaced blockchain distributed data structures, and systems and methods for managing the same. More specifically, the invention relates to novel permissioned chained data structures with multiple subspaces, integrated validation mechanisms that also provide for permissioning and secure access to subspaces in the chained data structures, and systems and methods for managing such permissioned chained data structures.

BACKGROUND OF THE INVENTION

Distributed databases can provide a decentralized means for distributing shared data across multiple different users, each of whom may have need for access to the shared data while being located remotely from one another. In order for such shared data to be reliable, there must be a way to verify the integrity of the data in the distributed database. One form of distributed database is a "blockchain" (or "block chain"), which is a type of data structure that consists of a time-ordered linked series of smaller data structures or records, called "blocks," each of which contains a link to a previous block in the chain. Each block contains a hash value of the prior block in the blockchain, which serves as a means for linking the two blocks. The use of hash values helps to ensure the verifiability of the data and to prevent modification of data within the blockchain. The integrity of blockchains is increased through their decentralized nature, in that there does not need to be a centrally located "official" copy of the blockchain. Instead, multiple verifiable copies of the blockchain may be stored with different users, thereby preventing unauthorized modification of the blockchain.

One drawback of such distributed and decentralized data structures like traditional blockchains is that the data stored within such data structures is necessarily accessible to each holder of a copy of the data structure. The accessibility of the data to each holder of a copy of the distributed data structure is necessary to enable the user to verify the integrity of the data stored therein, and to ensure that data stored within a particular copy of the distributed data structure has not been tampered with and modified without permission. As a result, such distributed data structures, like traditional blockchains, do not allow users to privately store data within the blockchain. Traditional systems that share and utilize such distributed data structures also do not require authorization or permissioned access and instead benefit from the lack of access controls, since the presence of additional users typically increases the number of copies of the distributed data structure and thus reduces the risk of tampering with records. In this regard, such traditional systems typically do not have a means for verifying the identities and associated permissions of nodes in the system.

SUMMARY OF THE INVENTION

Disclosed herein are systems and methods of for the creation and distributed management of novel data structures that are capable of allowing for secure access restrictions. The novel data structure and associated functions are based on blockchain principles, in that they are distributed databases that include linked blocks that together form a chain, where each block includes a hash of the prior block in the chain which links the two blocks together. But these novel data structures differ from traditional blockchain structures in that they include significant and novel features and functionality that allow for private data subspaces within the data set of each block, where such subspaces are only accessible by nodes that have permission to access such subspaces, and wherein copies of blocks are generally propagated in a manner such that a node receives only those subspaces for which the node is permissioned. For ease of reference, the novel data structures disclosed herein are referred to as "privately subspaced blockchains," recognizing, however, that these data structures differ significantly from traditional blockchains as described in detail below.

As disclosed herein, the novel data structures and management thereof provide the advantage of distributed, consensus-based verification of data payload (subspace) integrity wherein multiple different nodes retain copies of portions of the data structure, while at the same time providing data sharing with data isolation. In particular common reference data in the data structure is available to all permissioned nodes, while portions of the data payload (referred to herein as "subspaces" within the data structure) are only available to nodes that have sufficient access credentials. The systems and methods further provide for data to be permissioned to allow read/write access as necessary by nodes with sufficient permissions. The systems and methods of the present invention further provide novel means for the secure, authenticated transfer of these data structures among nodes, and for provisioning interconnections between nodes to facilitate such transfers such that communications between nodes concerning a particular data structure do not impact the system capacity or the ability to process communications between other nodes involving other copies of the data structure. The systems and methods of the present invention further provide improved consensus mechanisms for the data structure that ensure isolation, meaning that a failed consensus between a pair of nodes does not result in cascading failures between other pairs of nodes. The systems and methods of the present invention further provide improved consensus mechanisms for the data structure that ensure continuity, meaning that the system continues to process properly and data structure integrity is maintained even in the event of an unreachable processing node. The systems and methods of the present invention further provide for improved conflict management between nodes, as well as improved expansion such that the deployment of additional nodes does not require significant updates for existing nodes. In addition, the systems and methods of the present invention further provide for improved synchronizing with external databases in a manner in which the data is verifiable.

The novel privately subspaced blockchain data structures herein, and the related systems and methods may be used in a variety of contexts where the above features and improvements would be advantageous. For example, the novel data structures and related systems and methods may be used to implement secure exchanges of data relating to inventory management, parts tracking (e.g., aircraft parts maintenance cycle tracking), provenance verification for high value goods (such as diamonds), medical records, title transfers pertaining to real and digital property, secure document processing, and other areas and applications that benefit from data structures that offer the features of both distributed verification and permissioned data storage and access. In addition, the novel data structures and related systems and methods may be used to implement secure systems for smart contract applications, including those related to credit default swaps (CDS), equity swaps, and foreign exchange (FX) transactions.

According to an embodiment of the invention, a system for a cryptographic platform for distributing data structures within a peer-to-peer network is provided, the system comprising: a non-transitory computer-readable storage medium; a processor configured by executing one or more software modules including instructions in the form of code stored in the storage medium, the modules including: a communications module that configures the processor to transmit and receive over a network from a remote device encrypted data between a first peer node and a second peer node; a core module that configures the processor to create a state root that represents encrypted data exchanged between said first peer node and second peer node, and wherein the core module further configures the processor to create a global state root that represents encrypted data exchanged between a plurality of peer nodes within a network, and wherein the core module further configures the processor to create a permissioned block within a privately subspaced blockchain that provides a verifiable record of data exchanged between peer nodes with the network; a database module that configures the processor to store data propagated between said first peer node and second peer node to the storage medium; and wherein the database module further configures the processor to store the state root, global state root, and block to the storage medium.

In another embodiment, a computer program product is provided that is embodied on a computer readable medium for processing the distribution of data structures comprising: computer code for transmitting and receiving a plurality of encrypted messages between a plurality of peer nodes; and computer code for creating a plurality of state roots for said encrypted messages exchanged between said peer nodes; and computer code for storing a plurality of state roots within a global state root wherein each state root defines a subspace of data; and computer code for creating a privately subspaced blockchain including a plurality of global state roots including a plurality of subspaces.

In yet another embodiment of the invention, a cryptographic system for the distribution of data structures among peer nodes in one or more networks built on top of an underlying network is provided, wherein the data structures includes a plurality of global state roots and wherein the plurality of global state roots includes a plurality of state roots, the cryptographic system comprising: a memory that stores a plurality of permissioned blocks within a privately sub spaced blockchain; a state root generator that creates a state root based on encrypted messages exchanged between a plurality of peer nodes within a subspace; a global state root generator that creates a global state root based on one or more state roots; a block compiler that compiles said global state roots and state roots; and a permissioned block generator that generates said permissioned blocks where a permissioned block includes said global state root and one or more state roots.

In another embodiment, a system for providing a cryptographic platform for distributing data structures within a peer-to-peer network is provided, the system comprising: a cloud based database containing data, for each of a plurality of blocks, defining a plurality of global state roots, wherein each of the global state roots includes a plurality of state roots; a network enabled device for sending and receiving encrypted data, for a plurality of peer nodes; a computer server that is coupled to the network enabled device and the cloud based database and programmed to: encrypt data transmitted between a first peer node and a second peer node; automatically generate a state root for the data transmitted between said first peer node and second peer node creating a subspace of information; in response to the generation of the state root, automatically update a global state root; create a block that contains the updated global state root including a plurality of state roots including said state root with the subspace of information; and store said block within a privately subspaced blockchain in said cloud based database.

In yet another embodiment, a system and method is provided for storing instructions corresponding to private smart contracts and executing those instructions in a virtual machine using the privately subspaced blockchain data structures.

These and other aspects and advantages will become apparent to those of ordinary skill in the art by reading the following detailed description, with reference where appropriate to the accompanying drawings. Further, it should be understood that the foregoing summary is merely illustrative and is not intended to limit in any manner the scope or range of equivalents to which the appended claims are lawfully entitled.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The invention is described below in connection with the following illustrative figures, wherein:

FIG. 2 is a diagram showing the components of the core module and the database module of the above system, according to an embodiment of the invention;

FIG. 14 is an illustration of subspace validation mapping, according to an embodiment of the invention;

DETAILED DESCRIPTION

Although the present invention is capable of being embodied in various forms, for simplicity and illustrative purposes, the principles of the invention are described in part by referring to several embodiments thereof. It is understood, however, that the present disclosure is to be considered as an exemplification of the claimed subject matter, and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention.

Figure 1:
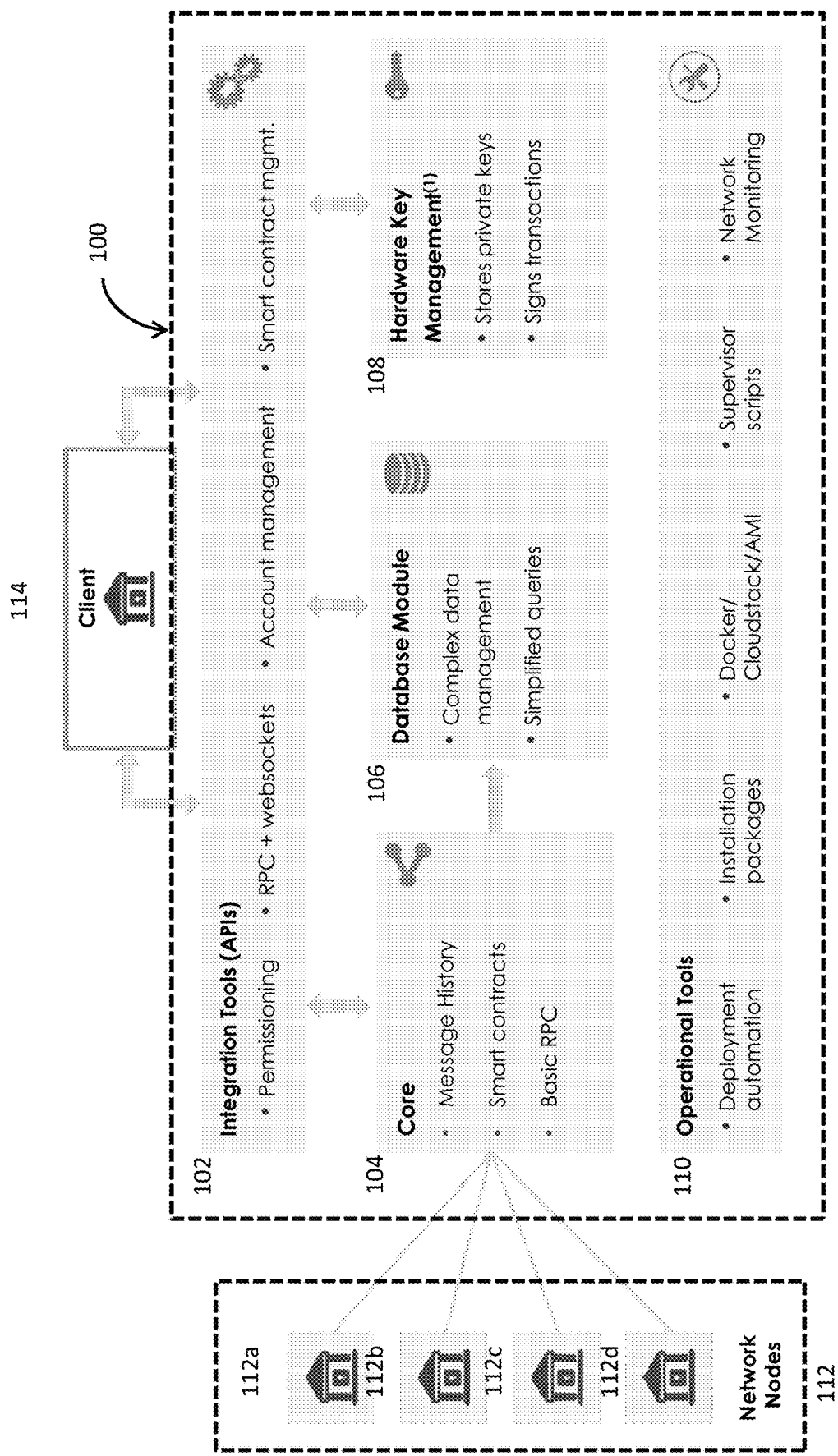
FIG. 1 is a diagram showing the components of the system for the creation and distributed management of data structures with secure access restrictions, according to an embodiment of the invention.

FIG. 1 illustrates a system 100 for creating for the creation and distributed management of privately subspaced blockchains, and other distributed data structures with secure access restrictions, according to an embodiment of the invention. The system 100 is built around distributed network of nodes 112 that are communicably linked with one another via a local area network (LAN) or wide-area network (WAN) such as the Internet, or combinations thereof.

Each node may be implemented on one or more servers with logic for carrying out the functions described herein. The components of system 100 (such as core module 104 and database 106) may reside on an individual server, or may reside on one or more servers. A core module 104 provides the core functionality of each node in the system. Each node with core module 104 may interact with a database module 106, which may be located on a separate server. In addition to the functionality associated with core module 104, each node may also include functionality associated with the APIs 102 (as further described below), and hardware key management 108 for increased security. The core module 104 includes functions that provide for the creation, configuration, and registration of nodes. After a node is created, the core module 104 initializes the node, connects the node to the integration tools (APIs) 102, and connects the node to one or more consensus nodes via a peer-to-peer network. The core module 104 configures the node based on the type of node (validating, peer, service), which determines the role of the node in the system 100, as further described below. The core module 104 further configures the node by providing the node with information indicating which subspaces the node has access to based on an identifier that identifies the party or user that is creating the node. In certain embodiments, the identifier of the party or user may be associated with a node type and may be used to identify the node type. For example, as part of the registration process, the system maintains and distributes to each node a table that associates an identifier for each party/user with a particular node type (validating, peer, service). Additionally or alternatively, the system distributes to each node a table that associates the unique node identifier of the node with the node type (validating, peer, service). Additionally or alternatively, node registrations are maintained through the use of information maintained in a common subspace to which all nodes in the system have access, thereby ensuring that registration data is consistent and available to all nodes. Node registration information includes a list of subspaces that a node is permissioned for, and for each subspace, the level of access rights (e.g., whether the peer has validator, peer, or service node access rights). In this manner, a node can have different levels of access rights for different subspaces. For example, at the same time a node may be a "validator" on one subspace, and a "peer" on another subspace. Node registrations may be managed in a specific script (e.g., a smart contract) that runs on the common subspace. Changes to the registration dataset are made by sending a message to the script on the common subspace, and such changes take effect once the message requesting the change is confirmed in a block in the privately subspaced blockchain.

Each node stores type information that indicates the type of node (validating, peer, or service), which determines the role of the node and its behavior with respect to system 100 and other nodes on the network, such as the node's data access level and its primary functions, as shown in FIG. 2. A validating node 202 has access to all subspaces for which the node is permissioned. A validating node is involved in the consensus process for validating blocks in the privately subspaced blockchain, as further discussed below. In particular, validating nodes come to an agreement with other nodes in a particular subspace regarding valid messages and blocks. The validating node 202 further relays all messages it receives to nodes that are permissioned to receive such messages, and commits messages to blocks on the privately subspaced blockchain. Like a validating node 202, a peer node 204 has access to all subspaces for which the node is permissioned. Unlike validating nodes, however, peer nodes are observers that do not participate in the consensus process. For this reason, peer nodes may be referred to as observer nodes. With respect to functionality, the peer node 204 also relays all messages it receives to nodes that are permissioned to receive such messages, but does not commit messages and blocks to the privately subspaced blockchain. In addition, the peer node 204 and validator nodes each provides access to external systems and interacts with such external systems. The peer node (like other nodes) is configured to maintain an enterprise database 208, as further discussed below. In this regard, the enterprise database contains extended datasets, and each node includes logic and programming that enables interactions with the database 208, such as the ability to store and aggregate data in database 208 and to efficiently query database 208, according to the type of node. In particular, peer nodes have logic and programming that enable the node to query the database 208. Validator nodes have logic and programming that enable the node to query the database 208 and to store and aggregate data in the database 208 through events linked to a smart contract. Along with the database functionality provided by database 208, the APIs 102 provide extended functions that enable the system 100 to be integrated with external legacy systems with other data formats. For example, the APIs 102 may include functions and procedures for accessing data stored in external legacy systems in data formats different from the blockchain structures described herein, for importing data into enterprise database 208, for querying such data, for integrating such data into system 100, for transforming data sets into formats suitable for use with the blockchain structures described herein, and for exporting data from the blockchain structures described herein into formats suitable for use by external systems. In other embodiments, the validating node may also interact with external systems. The service node 206, has access to a limited set of smart contracts within certain subspaces. The service node 206 also receives and relays a limited number of messages, although it receives all messages in a common subspace.

Figure 3:
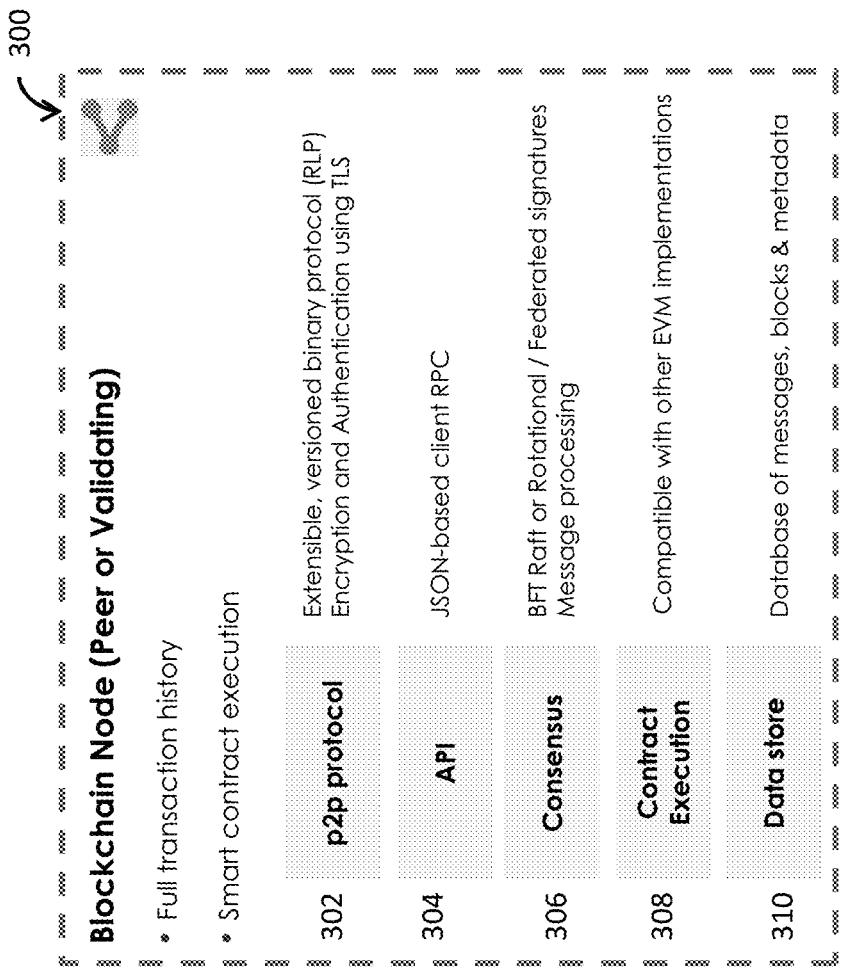
FIG. 3 is a diagram showing the components of a peer or validating node, according to an embodiment of the invention.

FIG. 3 provides a representation of a peer node or validating node 300 according to an embodiment of the present system, which shows the features and logic associated with each node. Each node may be implemented in one or more servers, with interfaces for communicating via a LAN or WAN to other networked nodes and components in system 100, with internal logic for carrying out the functions listed herein, and with internal storage for storing variables and data. Each peer node or validating node contains communication logic 302 for communicating with communicating with other nodes via a peer-to-peer (p2p) protocol, as further described herein. In a preferred embodiment, the nodes in system 100 use an extensible, versioned binary encoding scheme such as recursive length prefix (RLP) to format messages for communication. Messages sent by a node are signed with a private key to verify the identity of the sending node, and to prevent against spoofing. Each peer node or validating node further contains API logic 304 for implementing a remote procedure call (RPC) protocol through which the node can use to send notifications to other nodes and system components, as well as call for the execution of procedures and subroutines in other system components. In a preferred embodiment, the nodes use the JSON-RPC protocol. Each peer node or validating node further contains consensus logic 306 used to implement the consensus algorithm used by the system to validate messages and blocks, as further discussed herein. According to an embodiment, the system uses a Raft consensus algorithm, although other consensus algorithms may be implemented by logic 306. In other embodiments, a byzantine fault tolerant (BFT) consensus mechanism is used. In other embodiments, the system uses a rotational consensus mechanism or federated signatures to validate messages and blocks. The consensus logic 306 is also responsible for processing messages and adding validated messages to blocks. Each peer node or validating node further contains logic for script execution 308 which may serve as a runtime environment for executing scripts, including, for example, executing the code associated with smart contracts. The logic for script execution 308 may be compatible with Ethereum Virtual Machine (EVM) implementations. Each peer node or validating node further contains a data store 310 along with associated logic for storing, retrieving, and querying the data store. The data store 310 serves as a database repository of messages, blocks and associated metadata. In particular, the data store 310 includes one or more databases for long-term storage of system variables, such as privately subspaced blockchain data. The data store 310 provides each node with access to data for all subspaces for which that node is permissioned. Where the privately subspaced blockchains relate to smart contracts, the data store 310 stores smart contract information and provides rapid retrieval of such information for nodes.

A service node 206 differs from peer and validating nodes in that they do not process all messages (for example, they do not run all messages in the virtual machine) and do not maintain a complete state tree for each subspace. Service nodes receive subsets of data in subspaces, can either process messages in the virtual machine, or simply receive the data generated as the result of executing a script (e.g., the contract data). For example, service nodes can receive all messages to a particular transaction (e.g., a particular contract), or just receive that transaction data's latest state and not process any messages. Service nodes 206 request any portions of the state tree from a validator or peer node for which the service node is permissioned. Service nodes can be permissioned to receive all messages in a subspace, or just a subset of messages. This granular level of access is possible because subsets are defined by flexible filtering rules, for example, by sending account.

With respect to FIG. 1, a client terminal 114 is able to access the system 100 and the functionality of the core module 104 through the use of the system integration tools 102, which are a set of application programming interfaces (APIs). These APIs 102 includes function calls through which the client terminal 114 manages permissioning of the client's nodes, performs remote procedure calls (RPCs) and establishes connections with the nodes in the system network, manages the client's account with the system, and manages the content of data records (e.g., smart contracts) in the privately subspaced blockchains disclosed herein. In particular, these APIs 102 include functions that can be called by the client terminal 114 that access the functionality of the core module 104 in order to create, configure, and register nodes; interact with the novel distributed data structures disclosed herein; and configure permissioning and access to the system network. These APIs 102 further include functions that can be called by the client terminal 114 that access the functionality of the database module 106 in order to access data stored in the database module 106, manage such data, and perform queries upon such data. In embodiments where hardware key management is used, these APIs further include functions that can be called by the client terminal 114 that access the functionality of the hardware key management module 108 in order to store and retrieve private keys, and sign transactions. The APIs of the integration tools 102 interact directly with the privately subspaced blockchains. Any API command that involves creating or interacting with a data record in a privately subspaced blockchain generates a blockchain message, and returns a message hash value that can be used to identify the message so that it can later be retrieved and viewed by a user of the system 100. The client terminal 114 can take a variety of forms. For example, the client terminal 114 can be a graphical user interface (used by end-users) that provides a means for interfacing with APIs 102 by providing the APIs with data, calling functions provided by APIs 102, and displaying prompts and data from the APIs. The client terminal 114 could also be fully automated software that monitors external events invokes functions via APIs 102 when external events take place. For example, the client terminal 114 could be a matching platform that invokes ledger functions via APIs 102 to match counterparties in a trade.

Each node in system 100 that is created by the core module 104 also stores certain information that is used by the node to interact with the network of system 100. This information may be stored in a data directory in the node, in a database or table structure. Each node stores its type (validating, peer, or service). Each node in system 100 further includes a name, which is shared with other nodes in the system and is displayed in log files. Each node further includes a node identifier (or node ID), which is the full certificate of the node. Alternatively, a secure hash may be used to implement the node ID, thereby allowing the use of different certificate types and lengths provided that the hash is a fixed-length value (such as a fixed-length 32 byte hash value). In this manner, the permissioning contract (or "chainperm" script, as further discussed herein) needs only to store a fixed-length value that can be efficiently managed on-chain, without compromising security. Thus, for the node ID either the full certificate of the node can be used, or a certificate's hash (for increased efficiency and faster handling of data on-chain) depending on the specific requirements for each deployment of the system.

In a preferred embodiment, the nodes in system 100 use TLS authentication procedures, and thus the security certificate is a TLS certificate. This node ID uniquely identifies a node and is unique to the network. Each node further includes a signature address, which is a hash of the node's public key and is used for signing messages and blocks in the privately subspaced blockchain. The signature address information need not be present in observer nodes (such as peer type nodes). Each node further includes an array of domain names for which the node acts as a validator, as well as an array of domain names for which the node acts as an observer. Prior to participating in block and message creation, each node must have its own security certificate (such a TLS certificate) and signing key, which are stored in the node's data directory. In this regard, each node has two private keys: one private key for TLS authentication procedures, and another private key (e.g., an ECDSA private key) for signing blocks and votes, among other things, in accordance with the block creation and voting processes described herein.

With reference to FIGS. 1 and 2, system 100 further includes a database module 106 that includes one or more databases 208 for storage of privately subspaced blockchain data. The database module 106 provides one-way synchronization from privately subspaced blockchains into a common database format for storage. The database module 106 also allows supplemental data to be added to the privately subspaced blockchain data. The database module 106 further executes complex data queries and analytics against the data stored in the one or more databases. The database module 106 may reside on the same server as the core module 104, or may reside on a separate server.

The core module 104 further includes functions that provide for the creation of accounts associated with the local node. Each account defines the identity of the user on the privately subspaced blockchain. In addition, where the data stored within the blocks of the privately subspaced blockchain relates to smart contracts or other self-executing/self-enforcing scripts, the account is used identify actors with respect to the smart contracts and/or scripts. Accounts are unique identifiers for sending and receiving messages and self-executing scripts (such as smart contracts). Each account is referenced by an address that corresponds to its public key. Each account also has associated private keys that it uses when signing and interacting with the scripts in the privately subspaced blockchains. Accounts further define each of the identities of users on the privately subspaced blockchain. Where the privately subspaced blockchains are used to implement, for example, smart contracts, the accounts are used to identify the parties to the smart contracts.

The core module 104 further contains logic that provides the node with the functionality needed to communicate with and among other network nodes 112a-112d, including the ability to receive and relay messages, and commit messages to the privately subspaced blockchain. The communication network for system 100 is set up as a peer-to-peer network, with known identifies for each node in the network. The connections between nodes is authenticated through the use of TLS certificates, as described herein, and only those nodes whose TLS certificates are included within an approved list are allowed to connect to the network. In a preferred embodiment, the core module 104 determines the subspace for a message or command based on the identifier of the party/user originating the message or command, and on the identifier of the counterparty/user. For example, if party A sends a message or command and designates the counterparty B for the message or command as party B, the core module 104 determines that the message or command should be sent on the AB subspace.

Figure 4:
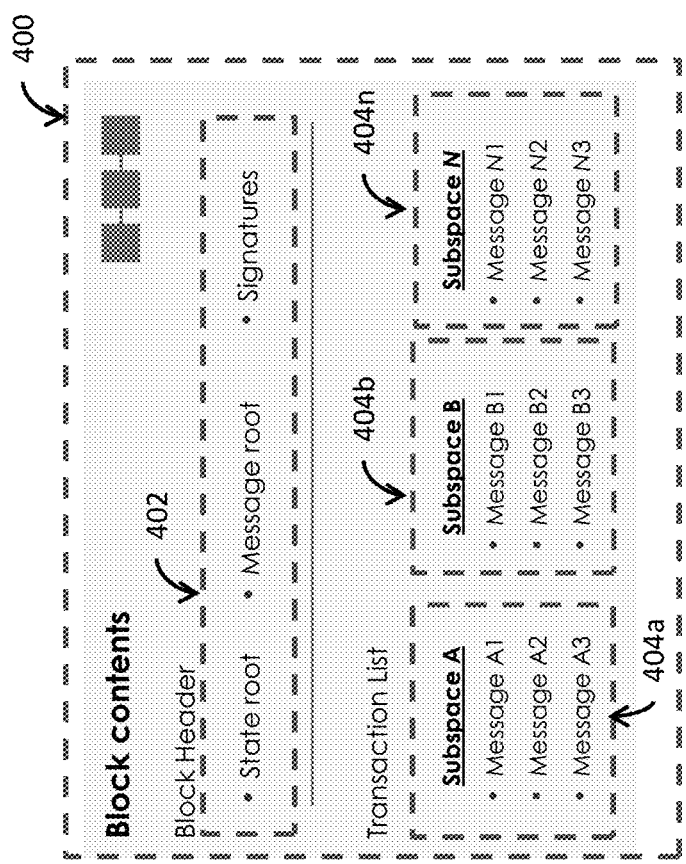
FIG. 4 is a diagram showing the contents of a block, according to an embodiment of the invention.

FIG. 4 provides a representation of a block 400 in the privately subspaced blockchain, according to an embodiment of the invention. Each block serves as a repository for data and includes a link to the previous block in the privately subspaced blockchain. Each block 400 includes a header 402 that has state information which is used to validate the contents of the block. As described in greater detail herein, the header includes a global hash value that is based on one or more underlying hash values that correspond to subspaces and other data in the block. In a preferred embodiment, the global hash value is the state root of a hash tree, such as a Merkle tree, and where the underlying leaves of the tree represent subspaces. The header further includes a message root, which is a summary of all messages contained in the block, and which updates based on events triggered by the contents of the privately subspaced blockchain. Each subspace includes, in addition to the subspace's state root, the subspace's message root, receipt root, and amount of "gas" used for the execution (i.e., the number of computational steps for the transaction execution). The message root and receipt root are tree root hashes that update based on events triggered by the addition of messages and receipts, and are based on the data contained in those messages and receipts.

For example the message root and receipt root may be Merkle tree root hashes calculated by adding all messages (or message receipts, in the case of the receipt root) that the block confirms for the subspace in a Merkle tree structure and getting the root value. The header further includes cryptographic signatures which are used to validate the block. Each block further includes a data payload that is divided into one or more subspaces, for example subspaces A, B, through N. These subspaces are isolated regions in a shared blockchain that only a defined subset of users are permitted to access and add to. In this way, subspaces create private areas for participants to store records and data which only permissioned participants receive. The subspaces contain logic (e.g., self-executing scripts, smart contracts) and data sets (e.g., series of data records, such as messages and receipts), that are specific to that subspace, and are guarded by access permissions such that they are accessible only to those nodes with permission to access that subspace. Each subspace can be accessed by only those nodes which are authorized for that subspace and may include a single party, multiple parties, or all parties on the network. In this regard, the privately subspaced blockchains of the present invention are significantly different from traditional blockchains implementations, which rely on public visibility for the contents of each block in order to ensure the validity and integrity of the blockchain. The subspaces of the privately subspaced blockchains may be separated based on a particular transaction (e.g., a credit-default swap (CDS) between two parties) or separated based upon the party or parties with access to such subspaces, as further described herein. For example, each subspace may store a series of transactions between a group of parties, with the message list in the subspace providing a complete history of such transactions. Only the parties to the transaction have permission to access the subspace corresponding to that transaction, and only nodes corresponding to those parties receive the content of those subspaces when messages and transactions are propagated by the system. In this regard, the data stored in these subspaces are stored in separate databases, and can be separately synchronized by nodes in the network.

In one embodiment, a subspace's data is organized by accounts. An account is referenced by an address, and it has a message nonce (a random or pseudo-random number used to uniquely identify something, in this case, a message record), scripting code or "bytecode" (i.e., smart contract code), and any key-value pairs that the account may keep in storage. There are two types of accounts: (1) user accounts, and (2) script/smart contract accounts. User accounts are accounts used by users to send messages into the system. The address of a user's account is derived from the public key of the user. A user account does not have any bytecode or key-value pairs associated with it. A script/smart contract account on the other hand has scripting code/bytecode and may store key-value pairs to persist data. A script/smart contract account's address is derived from the generating account's address and nonce, but there is no private key known that matches the address (public key) of a script/smart contract account. In such arrangement no user can send a message with the sender account being a script/smart contract.

Figure 8:
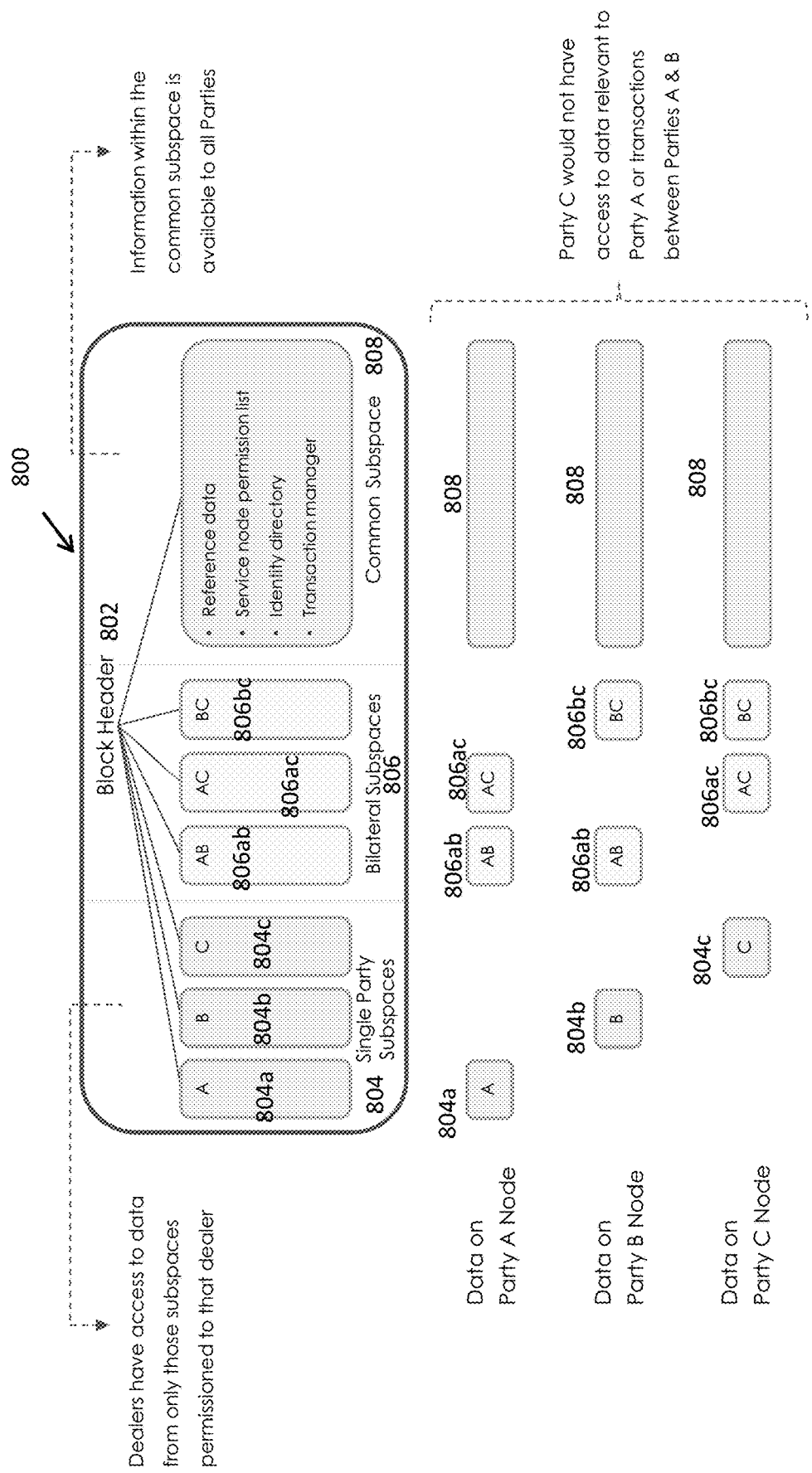
FIG. 8 is a diagram showing the accessible subspaces of data for three different nodes, according to an embodiment of the invention.

FIG. 8 provides another representation of a block 800 in the privately subspaced blockchain which shows the arrangement of subspaces in the payload of the block, according to an embodiment of the invention. In addition to the block header 802, as described above, the block 800 contains multiple subspaces which are divided based upon the parties who have access to that subspace. The subspaces include single party subspaces 804 to which only a single party is permissioned and has access to data, and which include subspace 804*a* corresponding to Party A, subspace 804*b* corresponding to Party B, and subspace 80*c* corresponding to Party C. The single party subspaces might contain records or transactions involving a single party, such as stock purchases from a stock exchange, commodity transactions, or medical records. The subspaces in block 800 further include bilateral subspaces 806 to which two parties each are permissioned and have access to data. In the example shown, these subspaces include bilateral subspace 806*ab* corresponding to Parties A and B, bilateral subspace 806*ac* corresponding to Parties A and C, and bilateral subspace 806*bc* corresponding to Parties B and C. The bilateral subspaces 806 might contain records or transactions involving two parties, such as credit default swaps, or equity swaps. The common subspace 808 contains reference data, service node permission lists, the identity directory (or peer registry) which provides the node ID of each node in system 100 and the corresponding types and permissions for each node, and a transaction manager, and other information and scripts that are for general use by all parties and nodes in the system, or which are necessary for a node to perform access and permission determinations by nodes. The transaction manager provides message scheduling services to allow users to schedule a message to be run automatically at a later point in time, or when a certain event has taken place. This message scheduling service functionality might also be provided by other components. The message scheduling service might be used, for example, to automate the payment of coupons for a trade contract (a time-triggered instance), or changing the name of a reference entity in a trade contract when the entity name is updated in the entity registry (an event-triggered instance). The common subspace may additionally include script/smart contract bytecode, application binary interfaces (ABIs), smart contract factories, database configuration information, and other domain or subspace state information. Additional subspaces involving other combinations of one or more parties are possible. Multiple subspaces may also be contained in a given domain as shown in, for example, FIG. 19. For example, a bilateral domain would be accessible to two parties (e.g., Party A and Party B), both of which would act as validators for that domain. Within the domain, both parties have access to all subspaces in that domain (any true private subspaces for either party would be located in a separate, private, domain in order to ensure privacy). Within a domain, different subspaces could be used to designate separate groupings of records, or separate transactions. For example, in a bilateral domain multiple subspaces might be created to handle transactions of different assets classes, with each subspaces corresponding to different asset class, thereby permitting the parties to process and track such transactions separately and independently.

Similar to blocks in a traditional blockchain data structure, the data records in each subspace contain data (such as data corresponding to a particular transaction between parties) along with a key based on the data (such as a hash value based on the data), and a link to the previous data record in the subspace. Through the use of subspaces, it is possible for nodes to reliably synchronize and validate data while at the same time keeping data sets related to different users isolated. In addition, through the use of subspaces the system 100 is able to provide for concurrent processing of messages in different subspaces. In traditional blockchains, messages and transactions must be processed sequentially in order to preserve the integrity of the blockchain. The subspaces in the privately subspaced blockchains allow for messages and transactions in different subspaces to be processed concurrently, and require only that messages in the same subspace be processed sequentially. In order to process a message in the virtual machine, a node needs access to all accounts (e.g., smart contracts including bytecode and storage) that the message invocation involves, with each in their latest state. For that reason, messages on the same subspace must be processed sequentially since each message may change the state of a transaction, which can have an impact on the result of a subsequent message execution. That said, messages are allowed to make certain calls into certain other subspaces, which introduces additional requirements on data access. For example, messages may make calls into the common subspace and into other subspaces within a domain.

Each copy of a block maintained on the nodes of a party reflects the privacy and access restrictions created by the subspaces. In particular, the nodes of a party contain copies of blocks that contain only the data in the subspaces for which the party and node are permissioned. As shown in the example in FIG. 8, the copy of block 800 maintained on a Party A node contains only the data located in the subspaces for which Party A is permissioned and has access, meaning that a Party A node contains a copy of block 800 that includes data from only single party subspace 804a, bilateral subspaces 806ab and 806ac, and the common subspace 808. The Party A nodes do not have any data from subspaces for which Party A is not permissioned, meaning that the Party A nodes do not have any data from unilateral subspaces 804b or 804c, or bilateral subspace 806bc. Similarly, the copy of block 800 maintained on a Party B node contains only the data located in the subspaces for which Party B is permissioned and has access and does not contain data from the subspaces for which Party B is not permissioned, meaning that a Party B node contains a copy of block 800 that includes data from single party subspace 804b, bilateral subspaces 806ab and 806ac, and the common subspace 808; but does not have any data from unilateral subspaces 804a or 804c, or bilateral subspace 806ac. And similarly, the copy of block 800 maintained on a Party C node contains only the data located in the subspaces for which Party C is permissioned and has access and does not contain data from the subspaces for which Party C is not permissioned, meaning that a Party C node contains a copy of block 800 that includes data from single party subspace 804c, bilateral subspaces 806ac and 806bc, and the common subspace 808; but does not have any data from unilateral subspaces 804a or 804b, or bilateral subspace 806ab. Because a node will not received data for a subspace for which the node is not permissioned, the subspaces remain completely private and there is no risk of inadvertent disclosure of data to a party or node that does not have access to such data.

Figure 9:
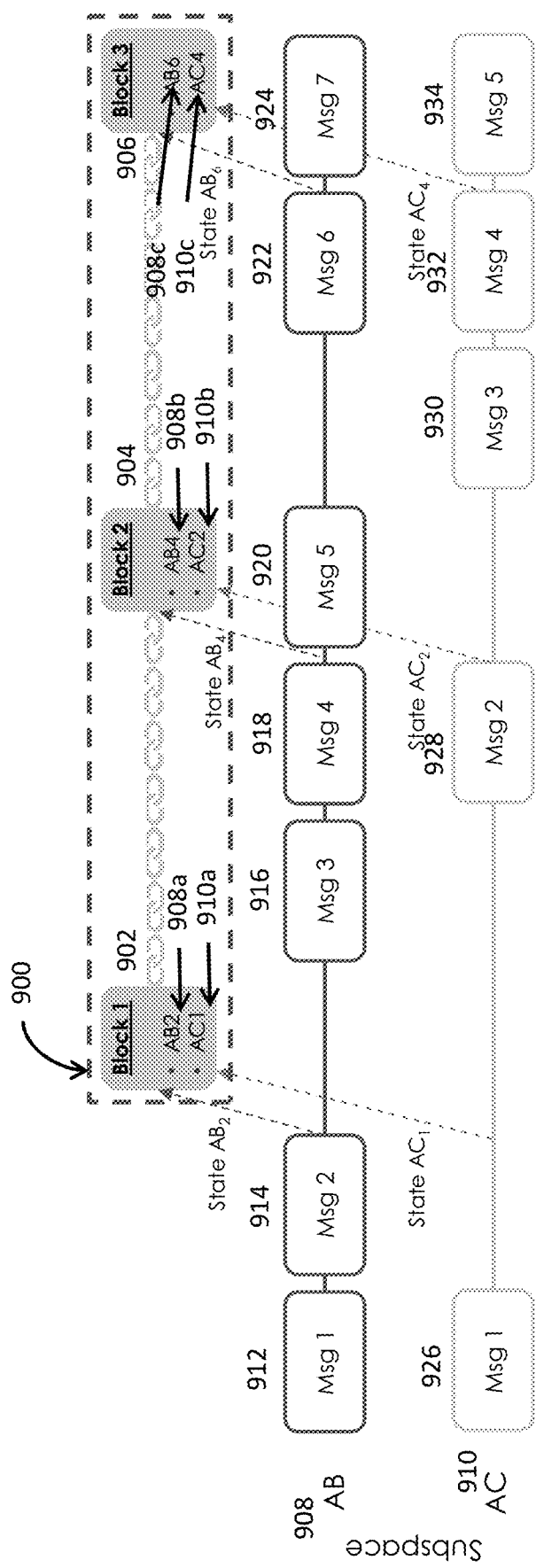
FIG. 9 is a diagram showing messages exchanged in subspaces being added to the privately subspaced blockchain, according to an embodiment of the invention.

FIG. 9 provides an illustration of the creation of blocks in a privately subspaced blockchain based on updates to a subspace, according to an embodiment of the invention. At the outset, nodes in the network from Party A and Party B exchange messages 912 and 914 relating to transactions between the two parties, resulting in a state AB2 for those series of transactions. Similarly, Party A and Party C exchange a message 926 relating to a transaction between them, resulting in state AC1 for the transactions between the those two parties. After consensus and validation of these messages, a new block 902 in a new privately subspaced blockchain 900 is created to as a secure record of these transactions and the information related thereto. The privately subspaced blockchain 900, and the blocks therein, have two bilateral subspaces: subspace AB 908 which corresponds to transactions between Parties A and B, and subspace AC 910 which corresponds to transactions between Parties A and C. Block 902 records messages 912 and 914 in subspace AB 908, and records message 926 in subspace AC 910. In a preferred embodiment, each message in a particular subspace are stored in the subspace in the form of blocks based on blockchain principles, where each block in the chain has an associated hash value, and where the hash value of the previous block is used to calculate the hash value of the current block, which creates a link between the blocks. For example, the first message 912 is stored as a first block in a blockchain corresponding to subspace AB 908, which the second message recorded as the subsequent in that blockchain. More specifically, the messages in a particular subspace are stored in the subspace in the form of a privately subspaced blockchain, as disclosed herein, which is capable of having additional subspaces (also in the form of privately subspaced blockchains). In addition, a state root AB2 908a is generated based on the messages stored in the AB subspace (consisting at this point of messages 912 and 914). The state root is a state key based on the data in the subspace, and is typically a hash value that is the result of a hash function performed on the data in the subspace. For example, the state root for each subspace may be the root of a hash tree, such as a Merkle tree; these state root may be part of a larger hash tree that includes the state roots for all subspaces, as further discussed herein. Similarly, a state root AC1 910a is generated based on the message stored in the AC subspace (consisting at this point of message 926). These state roots are generated by the leader nodes within a particular subspace for incorporation into the block header, as described in greater detail herein. In this way, the blocks include the most recently submitted state information from each subspace. In addition, and as further discussed below, consensus is achieved among validating nodes for each individual message or transaction within a given subspace before it is included in a block in the privately subspaced blockchain. Each individual messages must go through the consensus process to ensure that the outcome is always predictable and reliable. This is due, in part, to the inability of a validator node to reliably determine the order of messages it receives.

Figure 10:
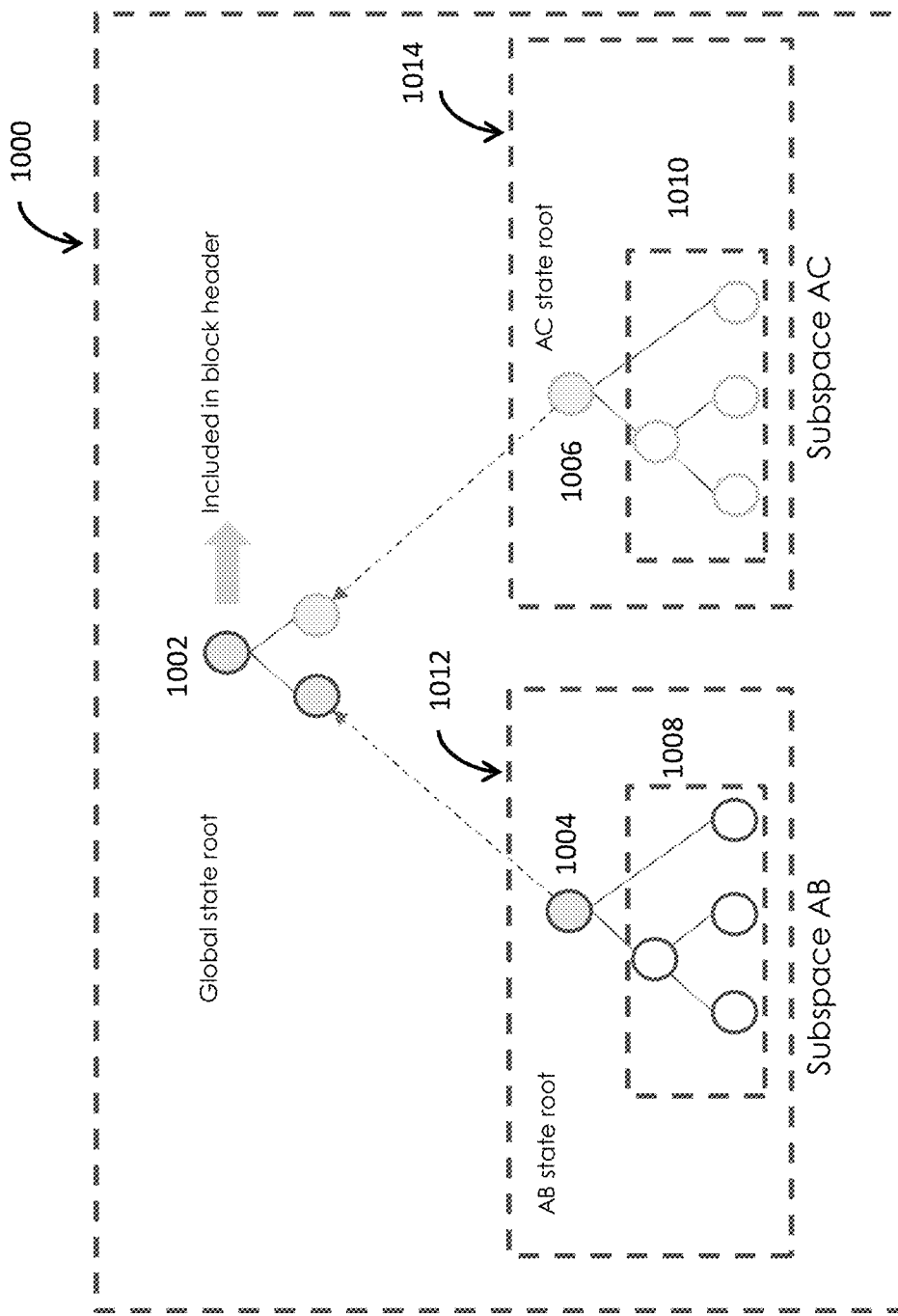
FIG. 10 is a diagram showing the creation of state roots and global state root to be included in a block header, according to an embodiment of the invention.

The generation of new state roots for the subspaces in a block also results in an update to the global state root for a block. This is because the state roots for the subspaces serve as inputs to a hash function that results in the value of the global state root. FIG. 10 provides an illustration of how the state root of subspace affects the value of the global state root for a block. Similar to the blocks in FIG. 9, block 1000 in FIG. 10 includes two subspaces: subspace AB 1012, and subspace AC 1014. Each of these subspaces has a state root: AB state root 1004, and AC state root 1014, respectively. Where a particular subspace does not have any additional subspaces therein (effectively "sub-subspaces"), the state root for the particular subspace may be the hash value for the latest block in the chain. Where a subspace has one or more multiple subspaces therein (i.e., multiple sub-subspaces), the state root for the subspace may be the root of a hash tree, such as a Merkle tree, based on the state root values of the one or more sub-subspaces. In this manner, each subspace is a recursive data structure element, and can be comprised of an hierarchy of blockchain structures, as shown in FIG. 10. The subspace AB 1012 has therein multiple subspaces 1008, and the state roots of these sub-subspaces serve as inputs into the hash function that generates the AB state root 1004. Similarly, the subspace AC 1014 has therein multiple subspaces 1010, and the state roots of these sub-subspaces serve as inputs into the hash function that generates the AC state root 1006. The validator nodes of a subspace has the ability to either accept or reject the state root of a sub-subspace.

As shown in the example in FIG. 9, subsequent messages 916 and 918 are generated with respect to transactions in the AB subspace, which results in the generation of a new state root AB4 908*b* for the AB subspace 908, and these messages and the new state root are validated before being stored in a new block 904 in the privately subspaced blockchain 900. Similarly, a subsequent message 928 is generated with respect to the transaction in the AC subspace 910, which results in the generation of a new state root AC2 910*b* for the AC subspace. The message 928 and new state root 910*b* are also validated before being stored in block 904. As further shown in FIG. 9, as additional messages (920, 922 in the AB subspace 908, and messages 930 and 932 in the AC subspace 910), corresponding to updated state roots (state root AB6 908*c* in the AB subspace 908, and state root AC4 910*c* in the AC subspace 910) are generated, and these additional messages and state roots are validated and added to new blocks in the chain (e.g., block 906). This process continues and additional blocks are added to the privately subspaced blockchain 900 as additional messages are exchanged in the subspaces.

In a preferred embodiment, new blocks are created in fixed time intervals based on the most recently submitted state information from each subspace. Alternatively, new blocks may be created based on the exchange of messages. For example, a new block may be created each time a message is sent that relates to a subspace in the privately subspaced blockchain. The creation of new blocks for a new or existing blockchain may also be triggered based on other events, including events external to system 100.

The initial block in a blockchain, the genesis block, is created according to a configuration file that is the same for all nodes on the blockchain. Genesis blocks, in contrast to all other blocks, are not signed, and they may contain any number of messages that are also not signed. For example, in case of the "public" domain which contains the "common" subspace, the genesis block contains messages that deploy a dedicated script or smart contract for managing permissions (e.g., a "chainperm" script) and register the initial set of validator nodes in that dedicated script or smart contract.

The system employs a distributed consensus algorithm for the privately sub spaced blockchains. The algorithm is designed with strong cryptographic protection against malicious actors, and uses byzantine fault tolerance (BFT) protections. According to a preferred embodiment, the consensus algorithm functions as follows. First, nodes that are permissioned as validating nodes in a subspace elect a leader node. The leader node then serves to announce messages and blocks to the remaining validating nodes in the subspace, which act as follower nodes. The follower nodes sign off on new messages and blocks by responding to the leader with approvals in the form of cryptographic signatures. Once a majority (more than 50%) of the follower nodes have approved, the leader node announces the validity of new messages, or the confirmation of a new block, to the follower nodes. Other nodes in the network that do not participate in the consensus process are able to verify in a trustless manner the message or block was approved by a majority of validating nodes by verifying the signatures on the message or block.

Figure 11A:
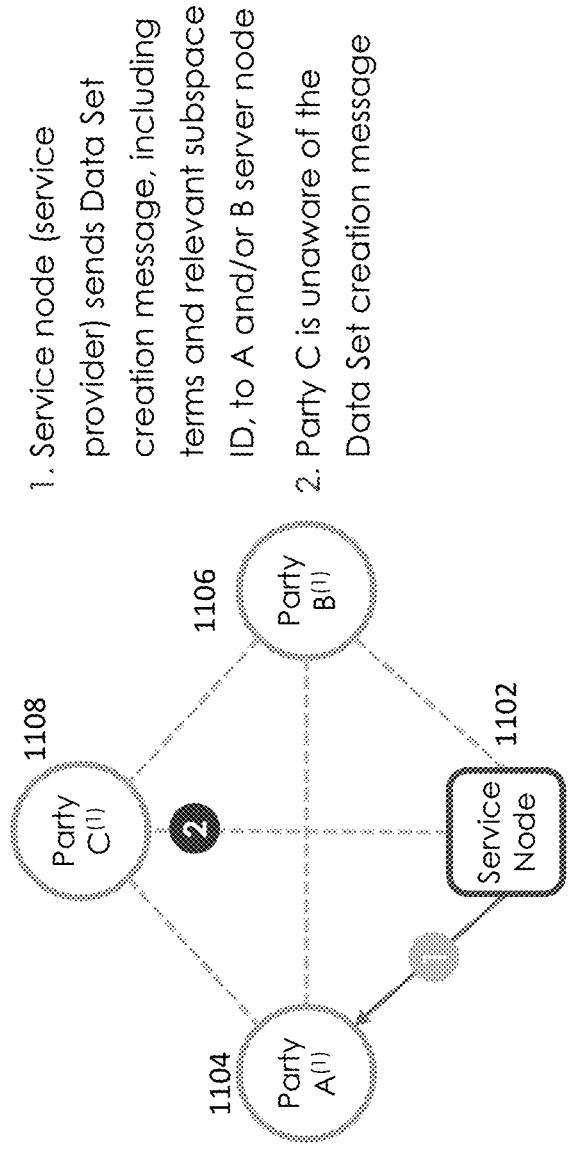
FIGS. 11A-D are diagrams showing the exchange of data, validation of data, and creation of a block incorporating state roots from all subspaces, according to an embodiment of the invention.

FIGS. 11A-D provide an illustration of the message propagation and validation processes for subspaces, and subsequent block creation process, in accordance with an embodiment of the invention. FIG. 11A shows the generation and communication of the initial transaction creation message. In the example shown in FIG. 11A, party node representations 1104, 1106, and 1108 represent a cluster of nodes that are managed by a party, in this case, Party A, Party B, and Party C, respectively. The cluster of nodes 1104, 1106, and 1108 and service node 1102 are communicatively coupled via the peer-to-peer communication network. A service node 1102 sends a transaction creation message for a transaction between Party A and Party B. The transaction creation message includes the terms of the transaction, and may take the form of a self-executing script or smart contract, and further includes the relevant subspace identifier, in this case the AB subspace. Notably, because Party C is not permissioned on the AB subspace and thus does not have access to transaction information on the AB subspace, service node 1102 does not send the transaction creation message to the Party C cluster of nodes 1108, and the Party A cluster of nodes 1104 and Party B cluster of nodes 1106 do not propagate the transaction creation message to the Party C cluster of nodes 1108, as further described herein. As a result, the Party C cluster of nodes does not receive the transaction creation message and is unaware of the transaction creation message.

Figure 11B:
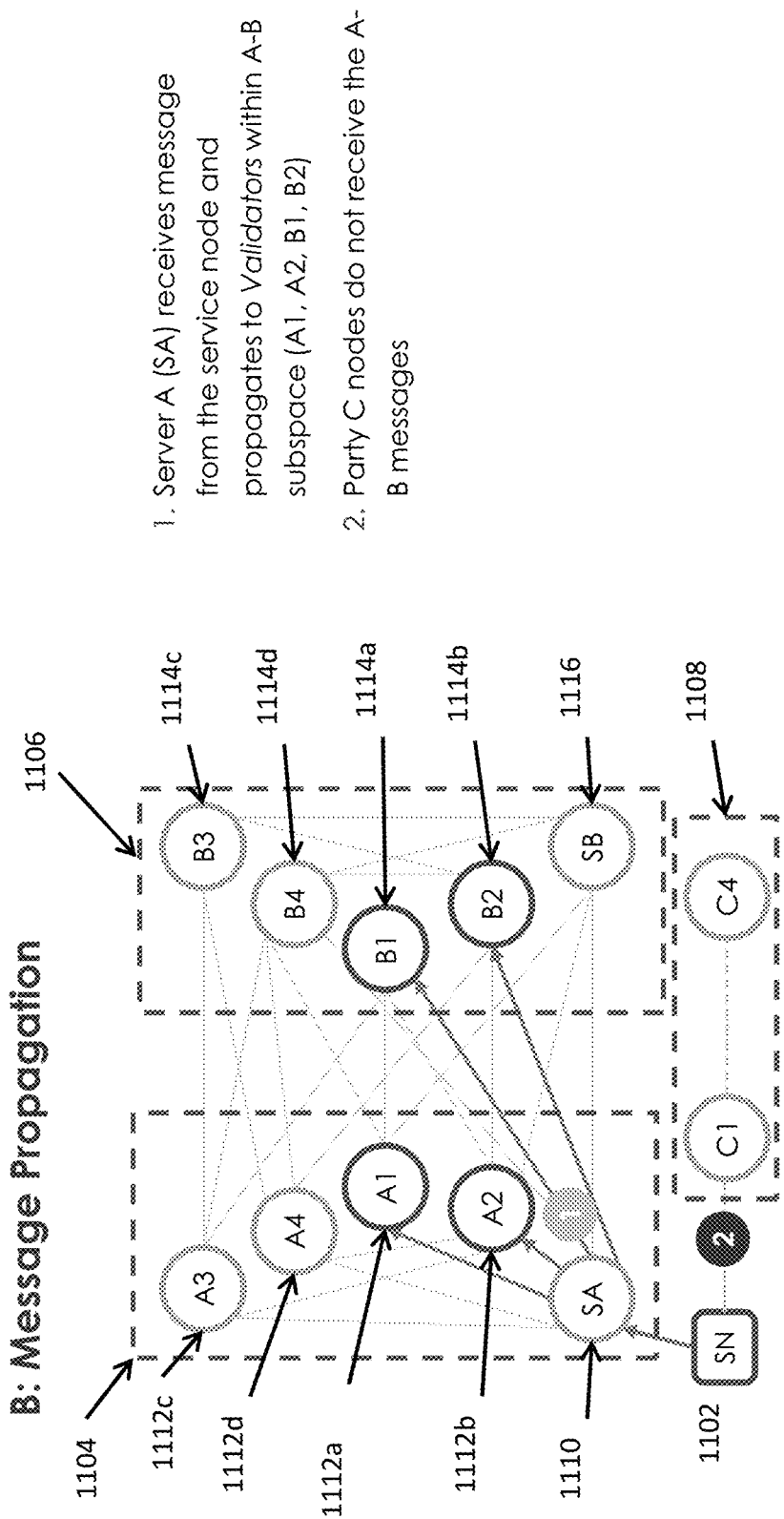
Figure 11C:
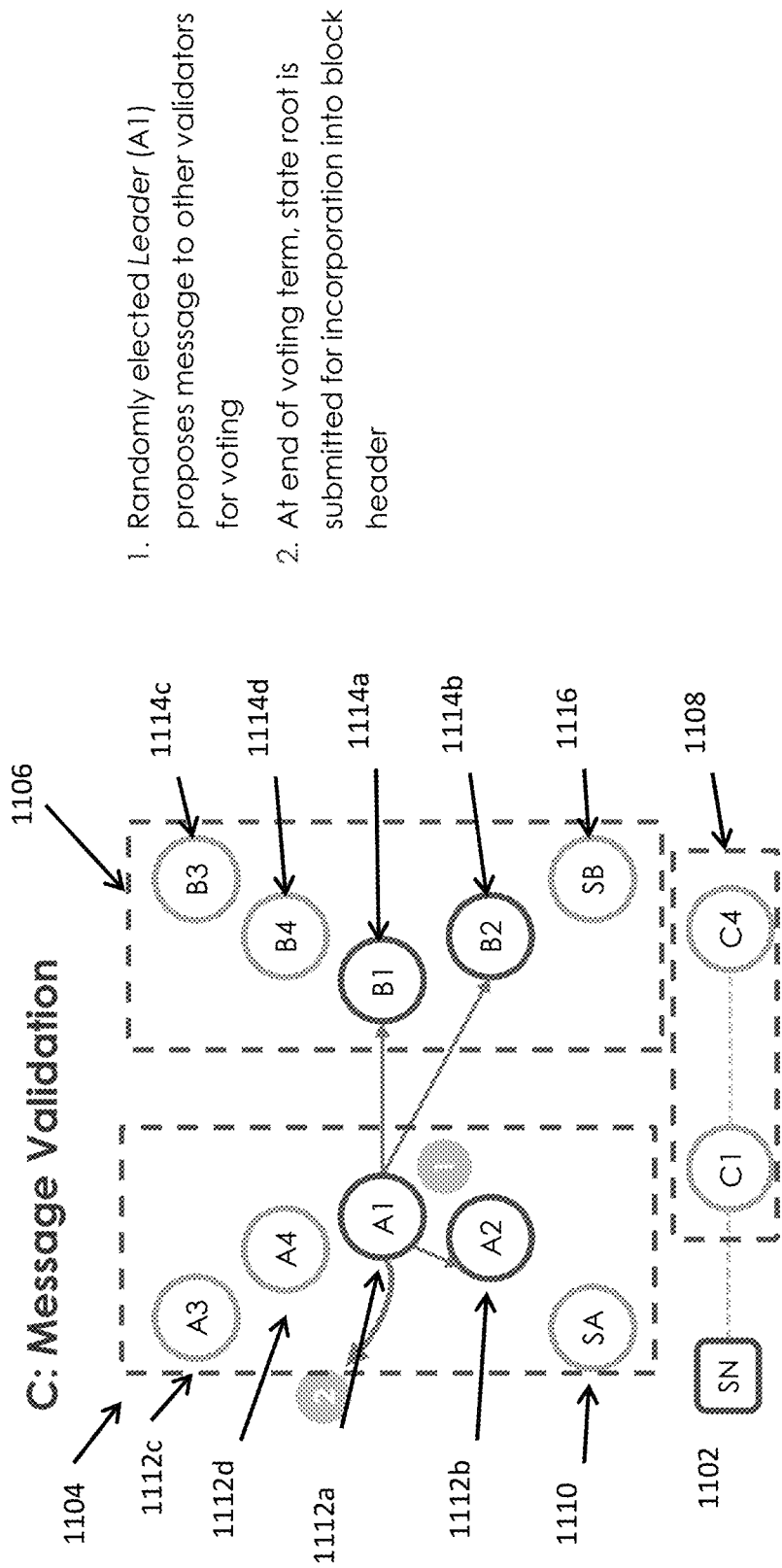
Figure 11D:
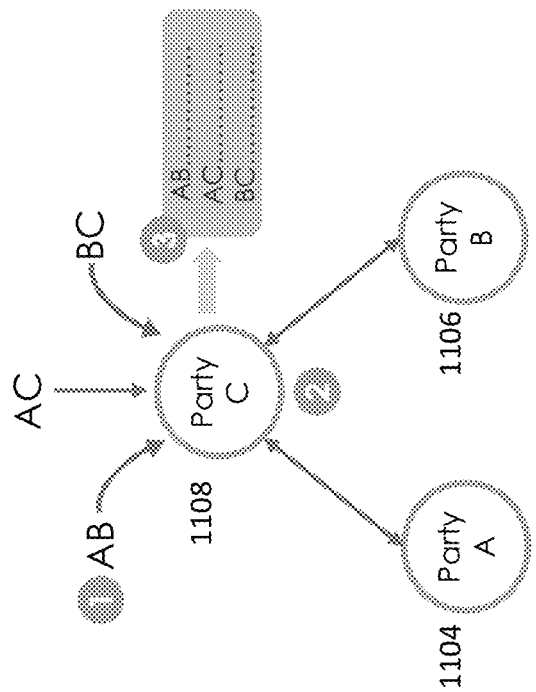

As illustrated in the example shown in FIGS. 11B and FIG. 11C, each message is propagated to all validating nodes in the network that are permissioned on the relevant subspace in furtherance of the validation and block creation processes. First, the service node sends the message to all validating nodes to which the service node is connected that are permissioned in the relevant subspace for the message. As shown in FIG. 11B, the service nodes 1110 and 1102 are non-validating nodes that are used as an entry point for sending messages. The service node A 1110 receives the transaction creation message from the service node 1102 and identifies that the message pertains to the AB subspace. As a result, the service node A 1110 propagates the message from the service node 1102 to all validating nodes with the AB subspace. The identification of the validating nodes for a particular subspace may be included within a block on the privately subspaced blockchain, or may be managed by scripts or smart contracts located on the privately subspaced blockchain. For example, in an embodiment a dedicated script or smart contract for managing permissions (e.g., a "chainperm" script) is deployed into the common subspace in the genesis block. To permission a node, a message it sent to the chainperm contract with the new node's name, public transport layer security ID (TLS-ID), public signing address, and lists of domains and subspaces the node is allowed to access and/or validate. Validator permissions are granted on a domain level, and observer (non-validator) access can be granted on a subspace level. The assumption is that all nodes, that accept connections from others, have access to at least the "common" subspace and therefore they can access and verify the chainperm contract. Since data within the blockchain ensures that all nodes on the network are synchronized, all nodes will have a consistent view onto the chainperm contract and will accept/reject node connections accordingly. In the example shown in FIG. 11B, the server node identifies nodes A1 (1112*a*) and A2 (1112*b*) in the Party A cluster of nodes 1104 and nodes B1 (1114*a*) and B2 (1114*b*) in the Party B cluster of nodes 1106 as validating nodes for the subspace. Again, because the Party C nodes are not permissioned in the AB subspace they do not receive the message.

Second, following propagation of the message by the server node to the connected validating nodes permissioned in the relevant subspace, the validating nodes proceed to validate the message through a consensus process, such as a Raft consensus protocol, although other consensus algorithms may be used such as a rotational leader mechanism. As shown in FIG. 11C a randomized process is used to elect a leader node for the consensus processes, which is node A1 (1112*a*). The elected leader proposes the message it has received for voting by all other validating nodes to which the leader is connected that are permissioned on the relevant subspace. In the example shown, leader node A1 (1112*a*) proposes the message received from service node 1102 for voting by the other validating nodes in the permissioned subspace, namely node A2 (1112*b*) in the Party A cluster of nodes 1104 and nodes B1 (1114*a*) and B2 (1114*b*) in the Party B cluster of nodes 1106. At the end of the voting term—which is determined by the particular consensus protocol and may be determined by the passage of a certain amount of time (a timeout), or the receipt of votes from all or a sufficient number of voting validating nodes—and assuming that a sufficient number of votes are received, the state root is submitted for inclusion into the block header.

Once the state root for the subspace has been approved for inclusion in the block header, the updated block for the network can be created. According to one embodiment, one of the validating nodes for the system is randomly elected as the leader for the creation of the block. All subspace leaders then submit their respective state roots to the block leader. In the example shown in FIG. 11D, a node in the Party C cluster of nodes 1108 (for example node C1) is randomly selected as the leader for the creation of the block. All subspace leaders, such as AB subspace leader A1 (1112*a*), therefore submit their respective elected state roots to the block leader, node C1 in the Party C cluster of nodes 1108. As the block leader, node C1 combines the state roots from the subspaces and determines a global state root and an updated block header and requests approval of the updated block header from follower nodes in the network. The follower nodes compare the updated block header from the block leader with their own determinations of the block header and indicate their approval to the block leader. Once approval is received, the block leader (in this example, node C1) creates the official block for that point in the privately subspaced blockchain, incorporating the state roots from all subspaces.

Figure 19:
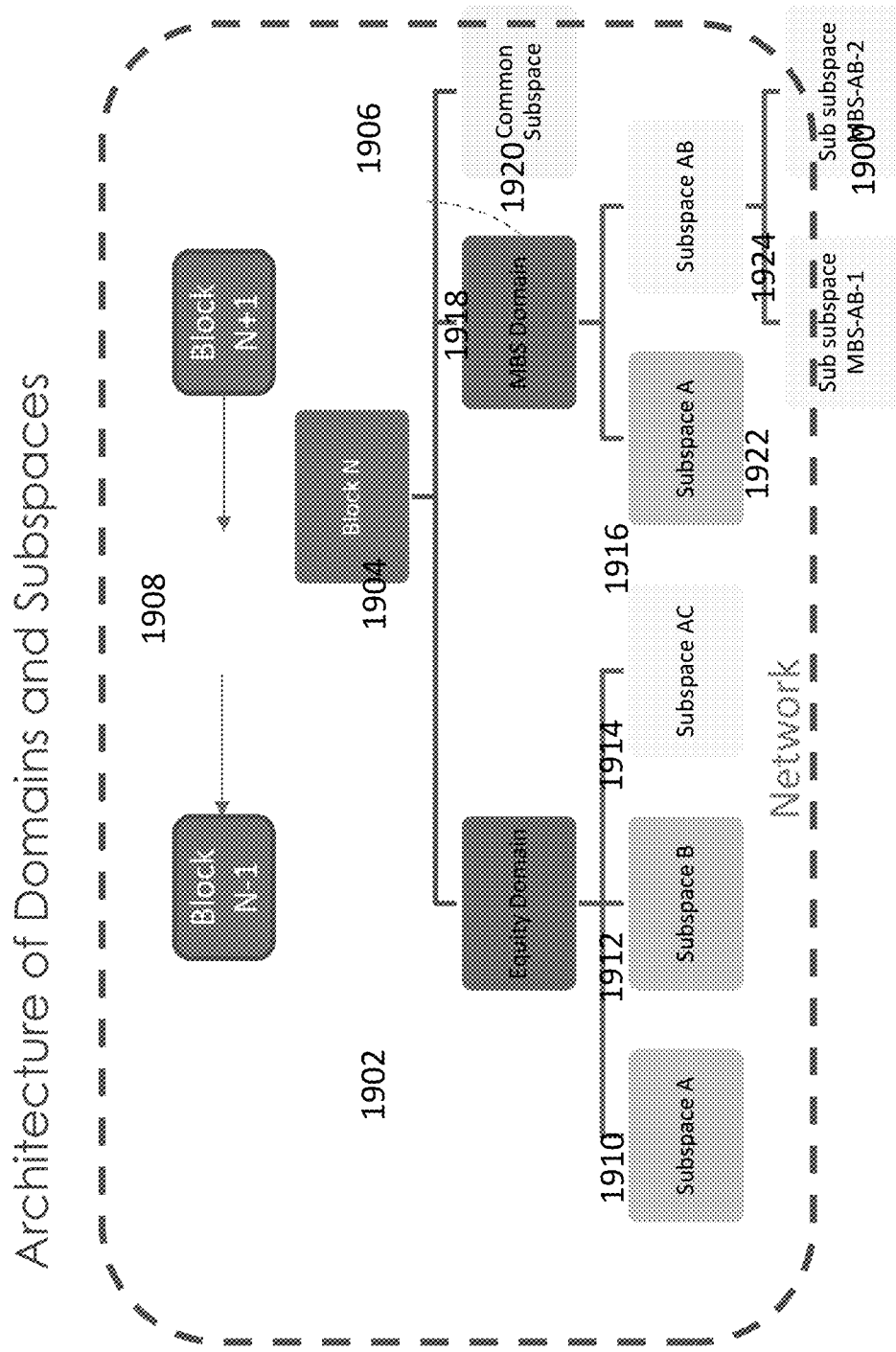
FIG. 19 is a diagram showing the relationship between domains and subspaces with respect to a privately sub spaced blockchain, according to an embodiment of the invention.
Figure 20A:
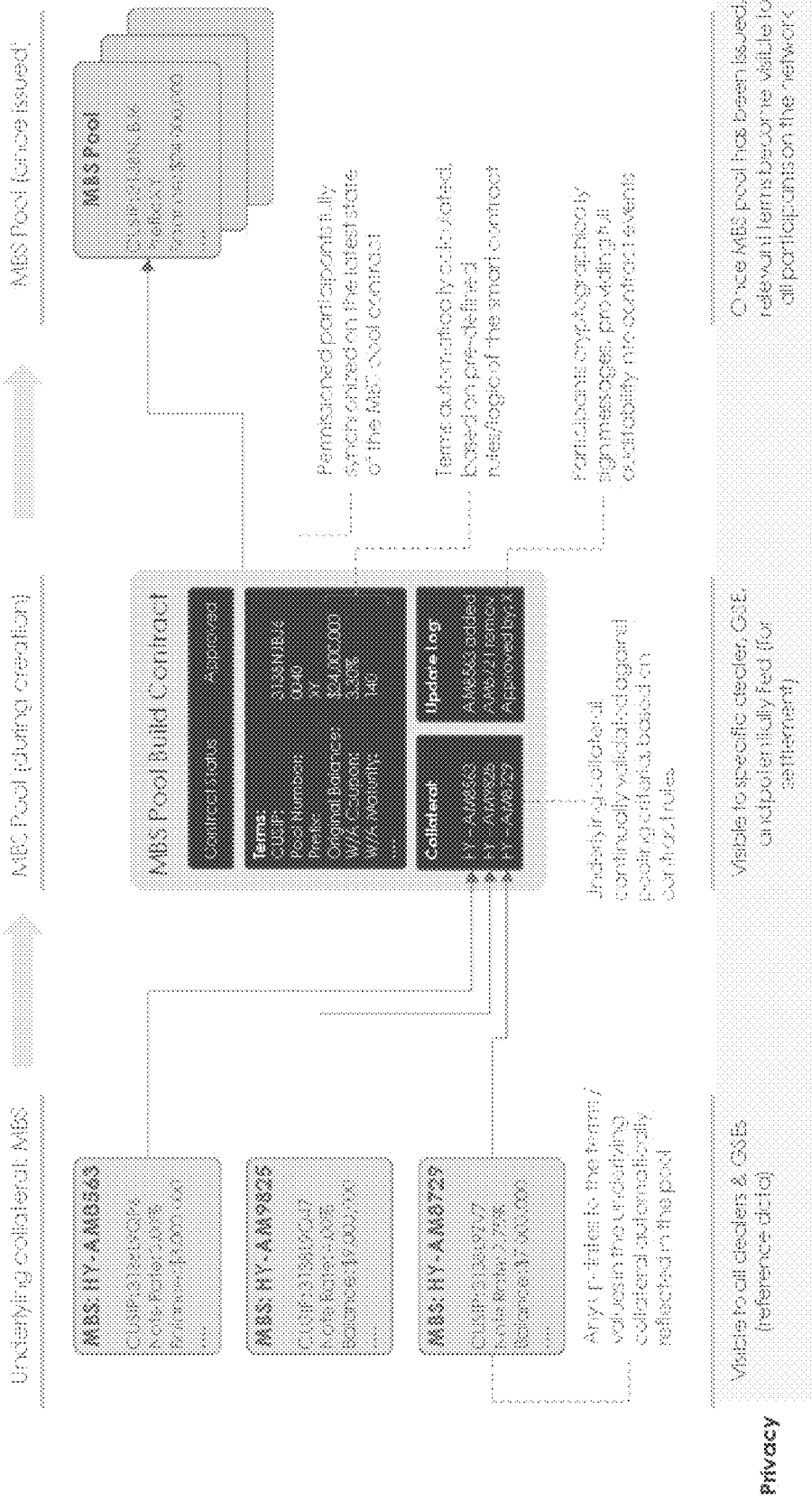
FIGS. 20A-B are diagrams illustrating the use of the privately subspaced blockchains and related system in implementing mortgage backed security (MBS) pools.
Figure 20B:
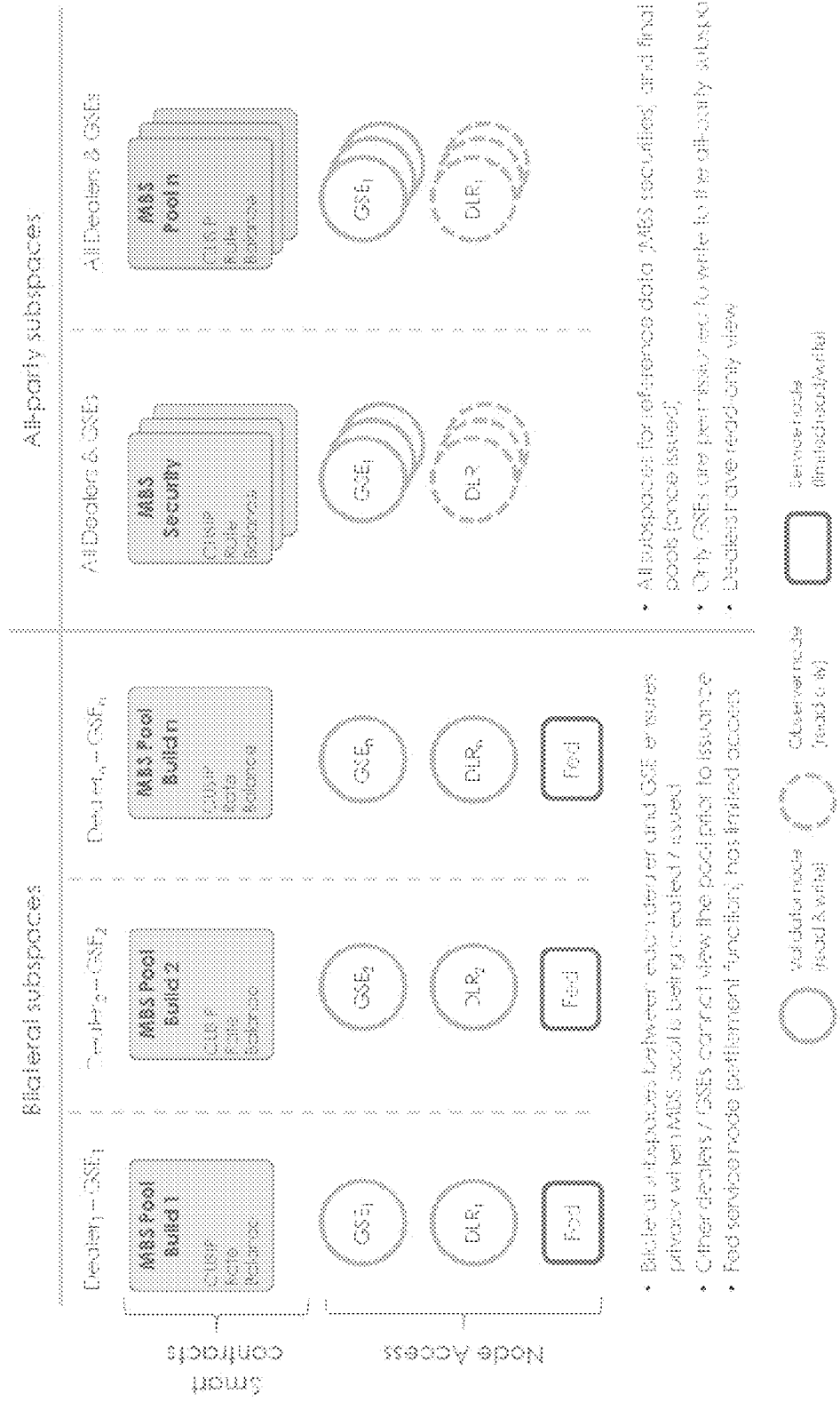

FIGS. 12A-G provides a further detailed illustration of a consensus process according to an embodiment of the invention. As noted above, the overall system typically comprises multiple domains and subspaces, as shown in FIG. 19. Each domain contains one or more subspaces, and each subspace is contained in exactly one domain. Each domain has its own privately subspaced blockchain starting at a genesis block. The consensus process is run for domains. In that sense, a subspace does not directly have a leader node or follower nodes, but the domain that contains the subspace has a leader and follower nodes. Each domain has its own set of validator nodes. One validator node can validate one or multiple domains; however the consensus processes are run in isolation for each domain. This means, a validator node that validates two domains, runs two separate instances of the consensus process. As a result, the validator node may "win" leadership on one domain, but act as follower on the other. In a preferred embodiment, there is only one implementation of the consensus process, which is the same for all domains.

Figure 12A:
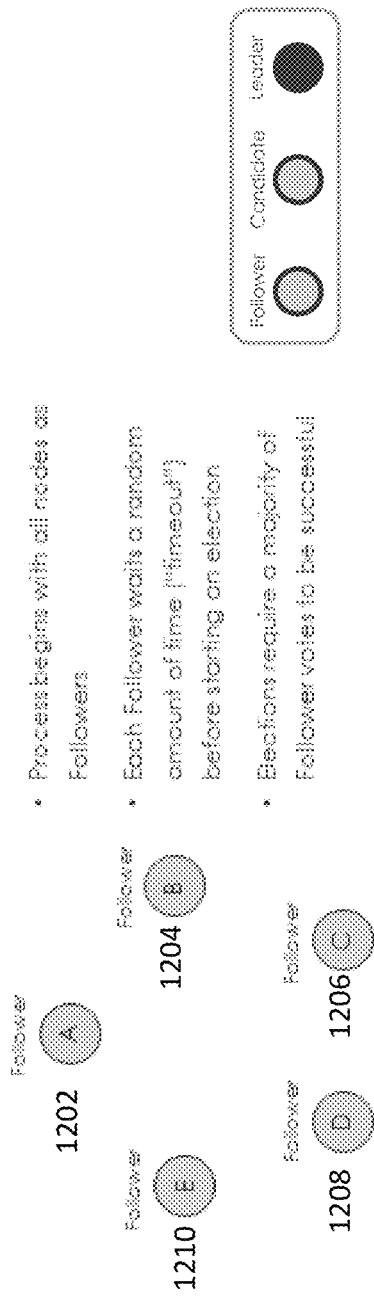
FIGS. 12A-G are diagrams showing the process of consensus among nodes, according to an embodiment of the invention.
Figure 12B:
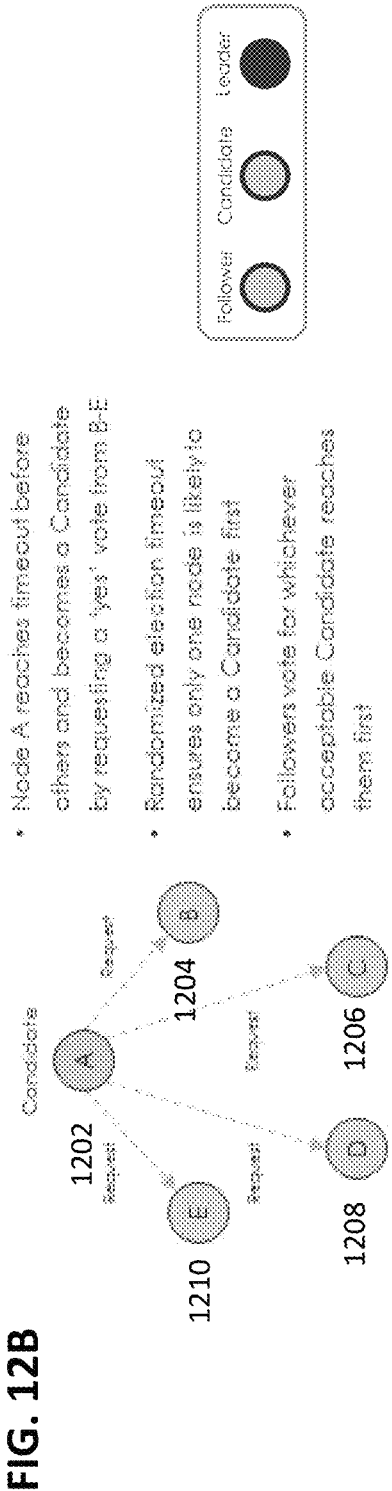
Figure 12C:
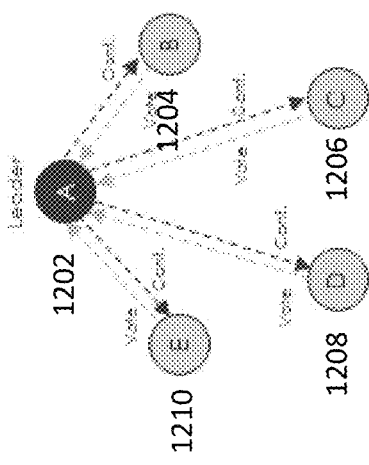

In a preferred embodiment, the consensus process used by the system is a byzantine fault tolerant (BFT) Raft consensus process, as shown. The process includes an election process to determine a leader, and a validation process. FIGS. 12A-C illustrates an election process, according to an embodiment of the invention. As shown in the example, there are five validating nodes A-E (nodes 1202, 1204, 1206, 1208, and 1210) that validate messages and transactions for a given subspace. At the outset of the process, there are no leader nodes and all nodes are considered followers. Each follower node awaits a random amount of time (a "timeout") before attempting to start an election and designating itself as a candidate node that requests confirmation votes from other validating nodes. As shown in FIG. 12B, node A (1202) reaches a timeout before the other validating nodes (or before receiving a request for a confirmation vote from any other validating node), and therefore it becomes a candidate node and sends out a request to each validating node to which it is connected that is permissioned in the relevant subspace in which the candidate node requests a confirmation vote, or "yes" vote. The timeout of each node is randomized over a sufficiently long period of time (dependent on network latency conditions) in order to optimize the likelihood that only one node is likely to become a candidate first. Each node sends a confirmation vote, or "yes" vote, for the candidate node whose request it receives first. In other words, each follower node vote for whichever candidate contacts the follower node first with a request for election. The candidate that receives a sufficient number of votes is elected as the leader. Note that elections require a majority of follower votes in order to be successful. In addition, to ensure the integrity of the voting process all confirmation, votes by followers are signed by the node generating the vote and all follower vote signatures are validated. After the follower votes have been sent, the candidate with a sufficient number of confirmation votes sends a message to the follower, confirming the election results and confirming that it has been elected as the leader. With respect to FIG. 12C, node A 1202, having timed out and sent out its request for votes prior to any other follower node, receives confirmation votes from each of the four follower nodes B (1204), C (1206), D (1208), and E (1210). Node A 1202 validates the signatures in the votes and, having validated the votes, sends confirmation messages to the four follower nodes confirming the election result identifying node A 1202 as the leader, whereupon the follower nodes store information that node A is the current leader. If there are no transactions, the elected leader sends out a periodic heartbeat message to all followers at fixed intervals. A node remains a follower as long as it receives valid periodic messages from the elected leader node. If the current leader is unresponsive, and fails to send out a periodic heartbeat message, a new leader election is carried out to obtain a new majority vote.

Figure 12D:
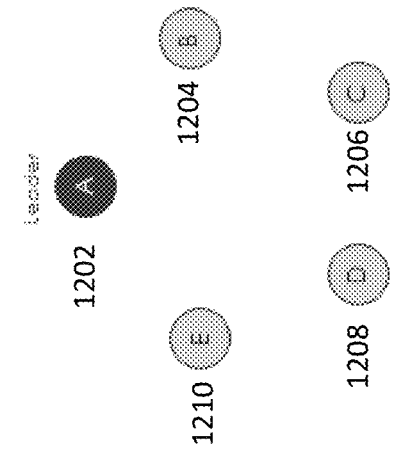
Figure 12E:
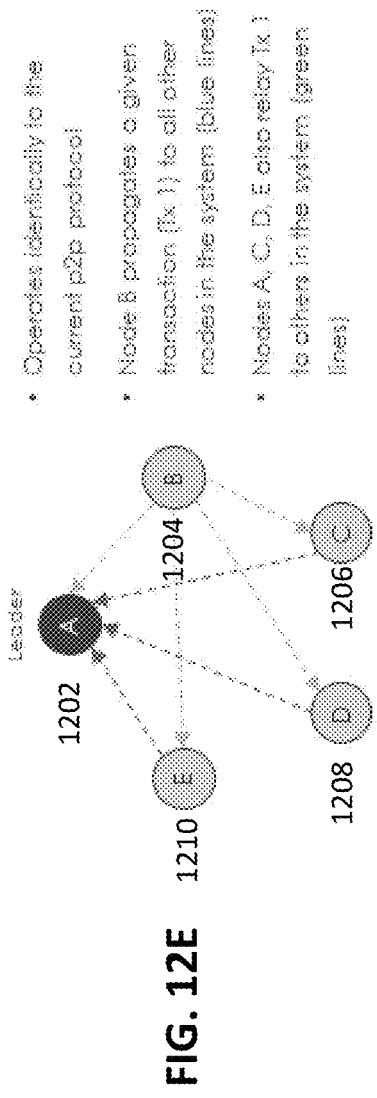
Figure 12F:
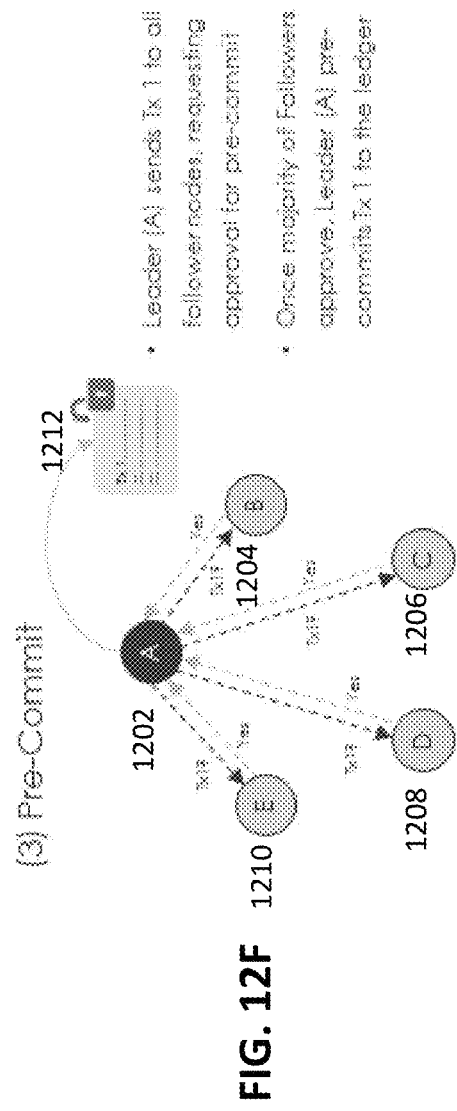
Figure 12G:
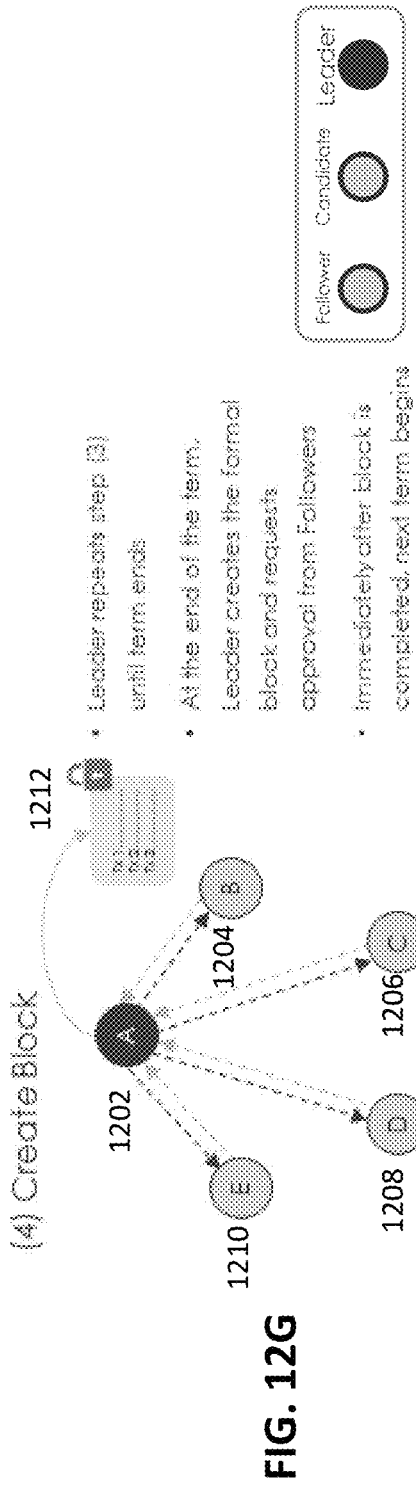

Once a leader is elected among validating nodes for a particular block or for a particular domain, the nodes may continue with the transaction validation and block creation process within the subspace. FIGS. 12D-G illustrate the consensus process according to an embodiment of the present invention. Following the election of a leader node, all follower nodes are aware of which node is the leader node for a particular block or subspace. The leader is responsible for creating blocks at the end of each consensus "term," where each consensus term may last only for a particular period of time (for example, anywhere between 1 and 3 seconds, and preferably 2 seconds), or may only last until a certain event occurs in the system. During each term, the leader is responsible for pre-committing transactions and messages to the subspace data. At the end of the term, pre-committed transactions and messages are approved by the followers whereupon the formal block is completed and committed to the privately subspaced blockchain. As shown in FIG. 12D, following the election all follower nodes are aware that node A 1202 is the leader from the verified election. When a message is received by a node, it is propagated by that node in accordance with the peer-to-peer message propagation as described herein. For example, as showing in FIG. 12E, node B 1204 receives a message representing a particular transaction (Tx 1), and responds by propagating that message to all other nodes in the system (node A (1202), node C (1206), node D (1208), and node E (1210)). These nodes A, C, D, and E in turn propagate the message to all other validating nodes in the network, including the elected leader node A 12012. Having received the propagated message, the leader node sends the message to all follower nodes requesting approval to pre-commit the message to the subspace. Each follower node examines the message in the request for approval from the leader node, whereupon the follower node sends an approval message to the leader node. Messages are approved for pre-commit by a follower node if they meet certain criteria to ensure that they are valid, including proper signing and a proper nonce value. In a preferred embodiment, messages are approved for pre-commit by follower nodes if they: (i) are formatted correctly (they conform to the message structure defined by the p2p protocol), (ii) are signed, and (iii) have a nonce value that is equal to the expected nonce for the sending account. Once a majority of follower nodes send their approval for pre-commit, the leader pre-commits the message to the subspace. The number corresponding to the majority of follower nodes is determined based on the number of nodes with permission to access the common subspace. As shown in the example in FIG. 12F, leader node A 1202, having received the message representing transaction Tx 1, sends the message to all follower nodes requesting approval to pre-commit the message into the relevant subspace. The follower nodes 1204, 1206, 1208, and 1210 determine that the Tx 1 message sent by leader node A 1202 is valid, and send their approval whereupon the leader node a 1202 pre-commits the Tx 1 message to the subspace.

The leader node continues to receive, approve, and pre-commit messages in accordance with the above process until its term ends. At the end of its term, the leader node creates a formal block that includes all pre-committed messages and sends copies of the block with a request for approval to all follower nodes. Once the leader node receives approval messages from a majority of the follower nodes the block is completed and committed to the privately subspaced blockchain. Immediately after the block is completed and added to the privately subspaced blockchain, a new term begins. Leaders may serve for multiple terms, or may be elected at the beginning of each term. The term number is incremented each time there is an election. A block does not end a term. Thus, while a leader is elected for one term, it may act as leader for multiple hours/days/weeks as long as it continues to make blocks. When there is a reelection, the term number gets incremented for each election round, until a new leader is determined. The new leader is allowed to be the same as the previous leader. As shown in the continuing example in FIG. 12G, during the term the leader node has received and pre-committed (following approval from the follower nodes) messages corresponding to transactions Tx 1, Tx 2, and Tx 3. At the completion of the term, the leader node A creates the formal block and sends it to follower nodes node B (1204), node C (1206), node D (1208), and node E (1210) for approval. Once leader A receives approval messages from a majority of the follower nodes, it commits the block to the privately subspaced blockchain. Thereafter, a new term begins whereupon subsequent messages are pre-committed to a new block.

Figure 13:
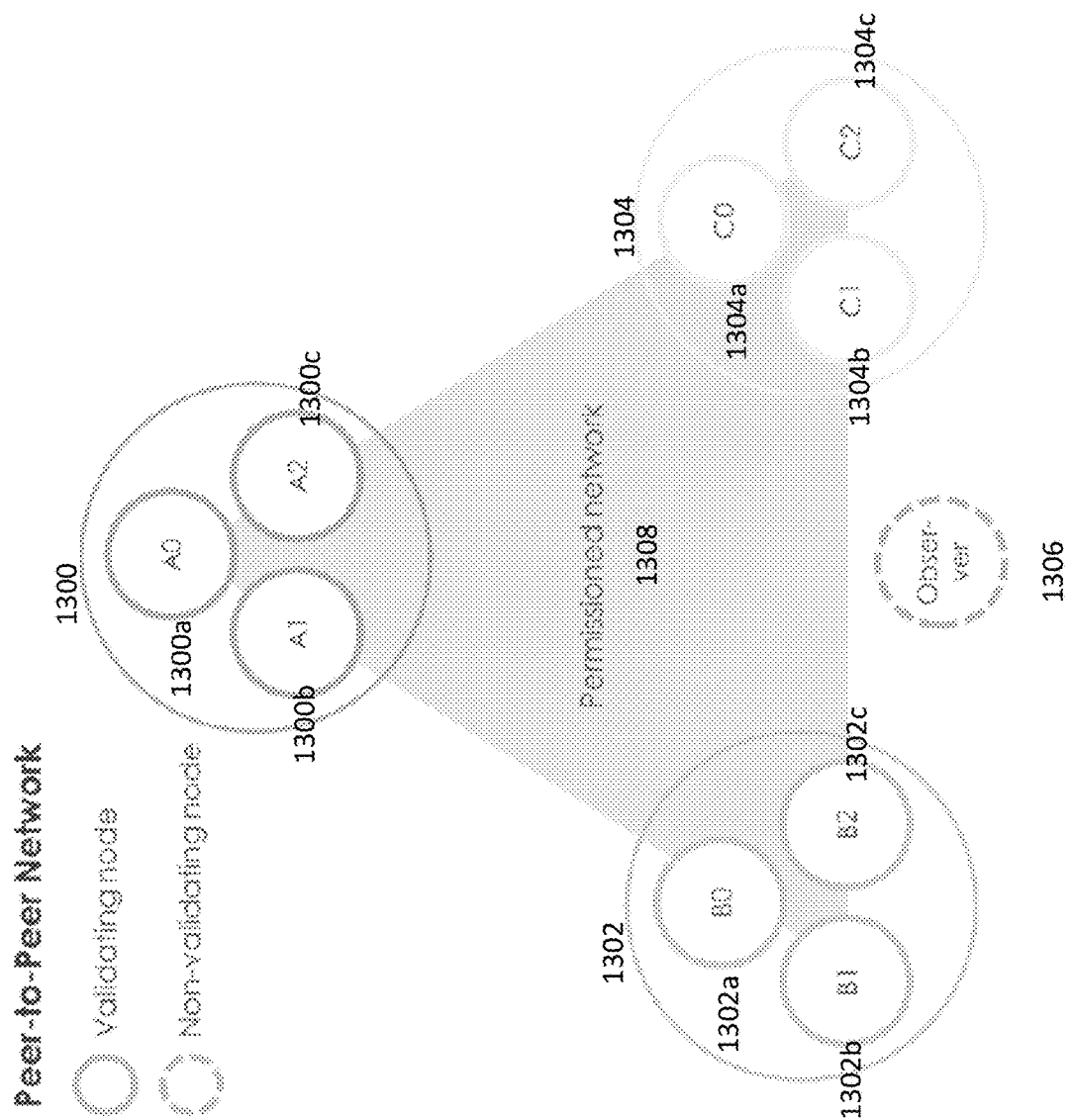
FIG. 13 is a diagram showing validating nodes within a permissioned network, according to an embodiment of the invention.

As noted elsewhere herein, node permissioning is on a per-subspace basis. In particular, the number validating nodes may differ per subspace. For example, as shown in FIGS. 13 and 14, a peer-to-peer network of nodes according to the present invention may include a number of validating nodes corresponding to several parties, but may differ in terms of the subspaces for which the nodes are permissioned as validating nodes. As shown in FIG. 13, a Party A cluster of nodes 1300 includes validating nodes node A0 (1300*a*), node A1 (1300*b*), node A2 (1300*c*); a Party B cluster of nodes 1302 includes validating nodes node B0 (1302*a*), node B1 (1302*b*), node B2 (1302*c*); and a Party C cluster of nodes 1034 includes validating nodes node C0 (1304*a*), node C1 (1304*b*), node C2 (1304*c*), all of which are authorized to access the system network 1308 and communicate with one another based on their type and permissions. As indicated in FIG. 14, however, although the nodes are all validating nodes, the subspaces in which they are permissioned as validating nodes differs. For example, node A0 (1300*a*) is permissioned as a validating node in subspaces A only 1408, AB 1400 and AC 1402, but not the common subspace 1406 (although node A0 may be permissioned as a peer node for the common subspace, and may therefore have access to data in that subspace). As another example, node B2 (1302*c*) is permissioned as a validating node in the B only subspace 1410 and the common subspace 1406, but not the AB subspace 1400 or the BC subspace 1404 (although node B2 may be permissioned as a peer node for the AB and BC subspaces, and may therefore have access to data in those subspaces). In any implementation, however, less than three validating nodes for a subspace is sub-optimal, since the use of just two validating nodes in a subspace carries an unacceptable risk of failure that the two validating nodes do not vote identically in any approval process.

As may be appreciated from the above discussion regarding the addition of blocks to the privately subspaced blockchains, these distributed data structures may become relatively large as time goes on and the number of messages and blocks in the privately subspaced blockchains increases. Unlike traditional block chain structures, the privately subspaced blockchains disclosed herein may be reduced in size through a novel pruning process, as described herein, that maintains the integrity of the data in the privately subspaced blockchains and preserves the ability to validate data and maintain the consensus process. The pruning of the privately subspaced blockchains allows for the memory needed for the data structures to be reduced significantly, saving hard disk space and resulting in increased efficiencies relating to data storage. In addition, pruning of the privately subspaced blockchains allow parties to remain compliant with data retention and destruction policies, which is not possible with traditional blockchain structures.

The pruning process described herein is triggered based on pre-determined criteria, such as time-based criteria. For example, a privately subspaced blockchain may prune messages and blocks after a certain amount of time, such as 2 years or 3 years after their creation. This amount of time may be dictated by regulatory policies or a party's own data retention policies. The predetermined criteria for initiating a pruning process to delete messages and blocks may be on a per-subspace basis, meaning that each subspace may have its own policies and criteria for pruning. In addition, different parties may utilize different policies and criteria for pruning of privately subspaced blockchains maintained on their party nodes and in their data stores. In a preferred embodiment, in each case the policies for pruning, and thus the criteria that trigger the pruning process, are maintained on the privately subspaced blockchains themselves, such as in the self-executing scripts or smart contracts embodied in the privately subspaced blockchains. The core module 104 of the system 100 administers the pruning process. The core module 104 retrieves the policies for pruning from each privately subspaced blockchain and monitors the criteria that trigger the pruning process according to those policies. Once the criteria are met, the core module 104 implements the pruning process such as by deleting blocks and messages based on a set of criteria, or filters, that identify characteristics of messages that can be pruned, while at the same time preserving the hashes of the blocks and messages (such as the state roots for the various subspaces in the blocks). For example, the pruning process may purge blocks and messages of a specific contract or set of contracts, or may purge blocks and messages that are beyond a given retention date. Because all of the hash values are retained during the pruning process, the consensus process is unaffected. However, any attempts to access the blocks and messages that were deleted due to the pruning process results in an error indicating that the data has been removed.

The pruning process provides for the removal of data in the state database (e.g., a Merkle tree) which, as noted above, enables compliance with data retention policies, as well as space savings. Each data object (e.g., each instantiated smart contract) exists in form of an object in that state database. When removing an object, for reasons of data retention policies or other reasons, the system must ensure that the tree's state root does not change for at least the reason that different participants may implement different data retention policies. To maintain consensus between parties with different data retention policies, the pruning of an object from the database is not allowed to alter the tree's state root. To achieve the removal of data while ensuring that consensus can be maintained, the pruning process described herein ensures that when hashing all neighboring tree nodes all the way to the root (e.g., Merkle tree hashing), the same root hash is calculated just as if the object was still in place. In this regard, to prune an object the system maintains the data objects tree node, but removes all payload from it. All that persists is the data object's address and the hash of the tree node. In addition, the data object is marked as "pruned," or as having had its payload removed. When accessed, data objects of that form are identified as "pruned," thereby allowing the system to distinguish between non-existent data objects and pruned data objects. The information retained in the object after the pruning process (e.g., the data object's address and the hash) does not allow recovery of the original data payload.

In an embodiment, additional information is embedded in a tree node of the data object to prevent recovery of the removed data payload. In certain circumstances, simply deleting the data payload may make the data object susceptible to efforts to brute force efforts to recover the data, such as by guessing the removed values until a matching hash is found. For example, if the blockchain is only used for one type of contract, and the only fields in the contract are date and value, the attacker could generate tree nodes matching that contracts bytecode with all reasonable combinations of date and value, until a matching hash is found. To protect against such an attack, a salt (i.e., random data used as an additional input for hashing information) is embedded in each tree node in each privately subspaced blockchain, which makes attempts to recover removed data via brute force and random guess attempts much more difficult, even if all non-random data is known.

Figure 5:
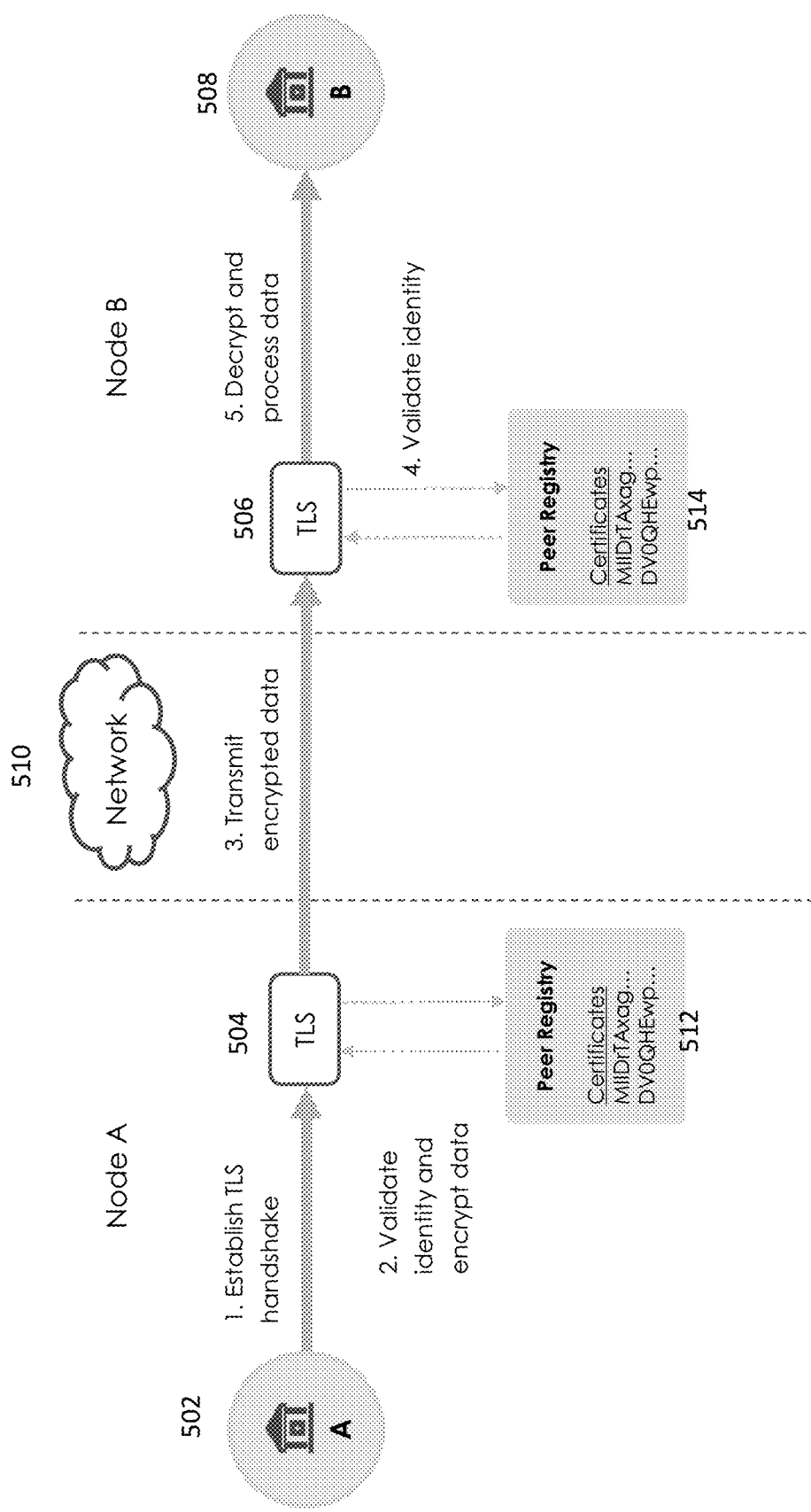
FIG. 5 is an illustration of two nodes exchanging encrypted data, according to an embodiment of the invention.

FIG. 5 provides an illustration of a secure communication process between nodes in the network of system 100. In a preferred embodiment, the system 100 uses transport layer security (TLS) functionality for authentication and identity management. The secure communication process involves a bi-directional authentication procedure wherein a node accepting a connection (the accepting node) verifies that the credentials (such as the security certificate) of the node to which it is connecting (the connecting node) are approved, and the connecting node verifies that the credentials of the accepting node are approved. In a preferred embodiment, the bi-directional process requires that the accepting node verify that the connecting nodes' TLS certificate is approved, and the connecting node verifies that the accepting nodes' TLS certificate is approved. Before a node can authenticate successfully and communicate with other nodes on the network, the hash value of the node's security certificate (for example, its TLS certificate) must be registered with the system 100. In one embodiment, each node's certificate is registered by core module 104 in peer registries 512, 514, with each node maintaining a copy of the peer registry. This registration requires the association of the security certificate with the type of the node (validating, peer, or service), such that the TLS certificate of each node is registered as being associated with a certain role. As illustrated in FIG. 5, when establishing a connection with another node in the system network, a first node 502, Node A, first undergoes a TLS handshake procedure through the use of a TLS module 504 that is communicatively coupled to a TLS module 514 of a second node 508, Node B. The initial exchange and validation of TLS certificates is according to the TLS protocol specification. Additionally or alternatively to the TLS protocol specification process, as part of the handshake process, Node B provides its identification in the form of its digital certificate, the TLS certificate. Node A validates the TLS certificate of Node B by checking whether the TLS certificate is registered in the peer registry 512. Additionally or alternatively, nodes can self sign without the use of a signature authority.

The system 100 implements a secondary validation step that checks whether the TLS certificate is approved in the peer registry (e.g., the "chainperm" script or contract). This is done only after the TLS certificate exchange is completed, but before the connection is used for any blockchain purposes. Referring to FIG. 5, the peer registry 512 corresponds to a dedicated script or smart contract for managing permissions (e.g., a "chainperm" script). If the TLS certificate returned by Node B is registered in the peer registry 512, then Node A, the connecting node, determines that the TLS certificate of Node B, the accepting node, is approved, whereupon Node A 502 encrypts the data based on the session key and transmits the data and its TLS certificate via network 510 to Node B 508. Node B, through the use of TLS module 506, validates the TLS certificate of Node A by checking whether the TLS certificate provided by Node A is registered in the peer registry 514. If the TLS certificate returned by Node A is registered in the peer registry 514, then Node B, the accepting node, determines that the TLS certificate of Node A, the connecting node, is approved, whereupon Node B 508 decrypts the message to retrieve the data in the message and processes the data accordingly. This secure communication process provides significant advantages over prior systems because the transport layer security (TLS) functionality is used not just for encryption, but also authentication in the system.

Through the connection process, a node also determines the type of each node it is connected. As discussed above, each node registers in the system as a particular type (validating, peer, service), and each node can be approved with a different node type for different subspaces and domains. This registration information is maintained in the dedicated peer registry (e.g., the "chainperm" script). In particular, the system maintains and distributes to nodes in the network a registry that associates a unique identifier of each node with its type. As discussed above, the unique identifier of each node is derived from its TLS certificate. When a connecting node connects to another node in the system, the connecting node obtains the TLS certificate of the other node in the system, and based on the TLS certificate and the information maintained in the registry, the connecting node determines the associated type of the other node. As a result, each node determines what validating nodes it is connected to, what peer nodes it is connected to, and which service nodes it is connected to. The type of each node and the types of the nodes to which it is connected affects how the node processes messages in the system. A node registered as a validating node will automatically participate in the block and message validation process, but will discard any validation peer-to-peer messages received from an observer or service node. In addition, a node that receives messages and blocks that require consensus will only send such messages and blocks to nodes that authenticate as a validating node.

As noted above, permissions—or the actions a node is allowed to take with respect to other nodes and data in the network—is grouped by subspace, meaning, for example, that a node may be a validating node with respect to one subspace and may be a peer node on another subspace. In particular, a node may have a set of subspaces for which it is allowed to validate, such that it participates in consensus voting and blocking signing processes. In addition, a node may have a set of subspaces for which it is allowed to observe as a peer, such that it engages in passive importing of blocks and messages. And a node may have a certain set of subspaces where the node is allowed only to connect as a service node (or API client), such that it does not participate in consensus, or engage in active or passive activity with respect to blocks and messages. In this regard, a node is only allowed to originate blocks and messages for subspaces where it is permissioned to validate, serve, or act as a service node/API client. According to the present system, the initial block in each permissioned blockchain, referred to as the genesis block, includes an initial set of validating nodes for each subspace therein. The genesis block may further include a list of peer nodes and service nodes for each subspace. The set of identified nodes and their corresponding roles (and levels of permission) with respect to each subspaces is therefore maintained on-chain, and is used to determining what actions a node is allowed to take with respect to each subspace. The set of identified nodes and their corresponding roles (and levels of permission) with respect to each subspaces can be updated by a specific message.

Figure 6:
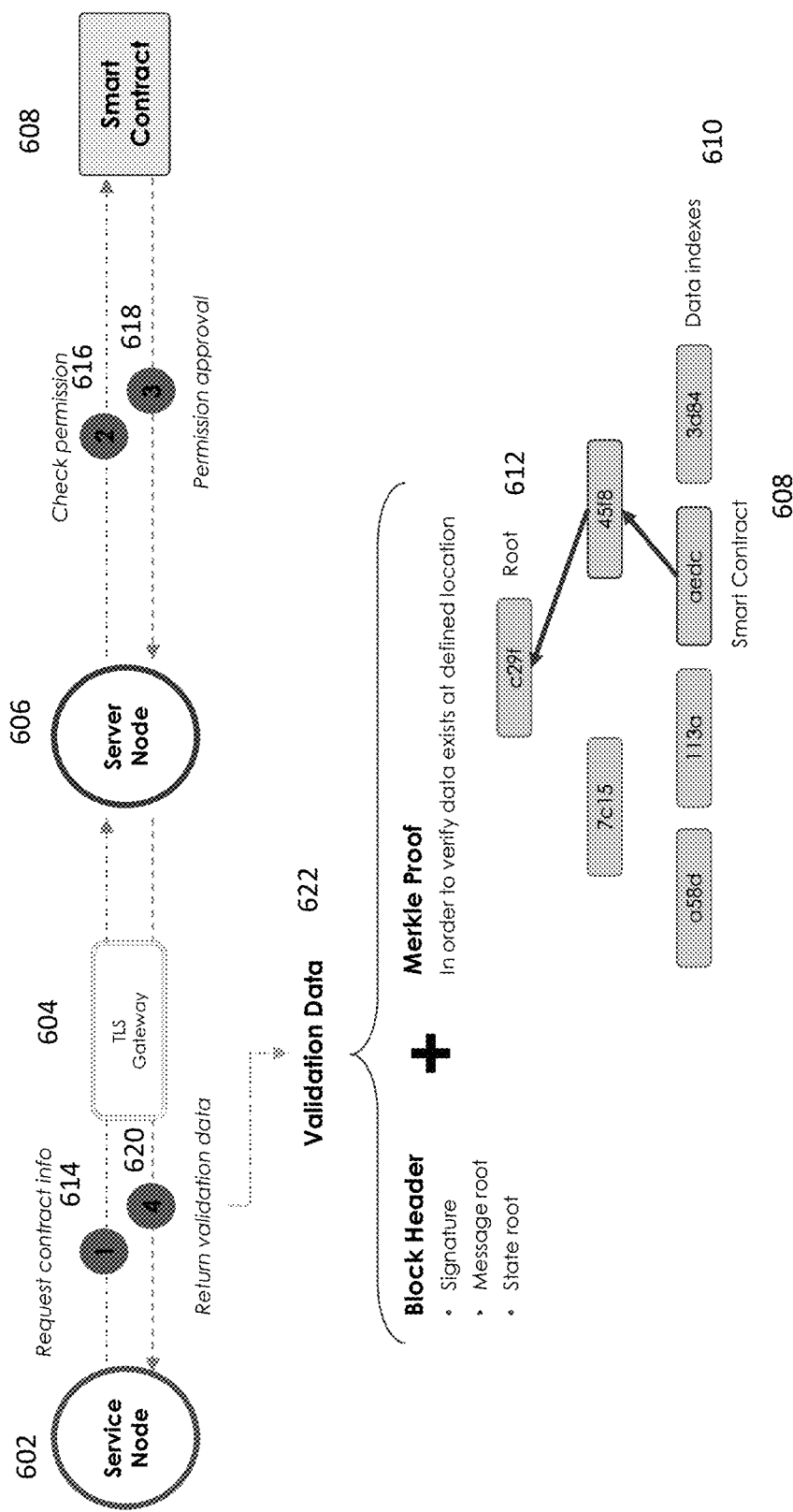
FIG. 6 is an illustration of a service node requesting data, checking permissions, and validating data, according to an embodiment of the invention.
Figure 7A:
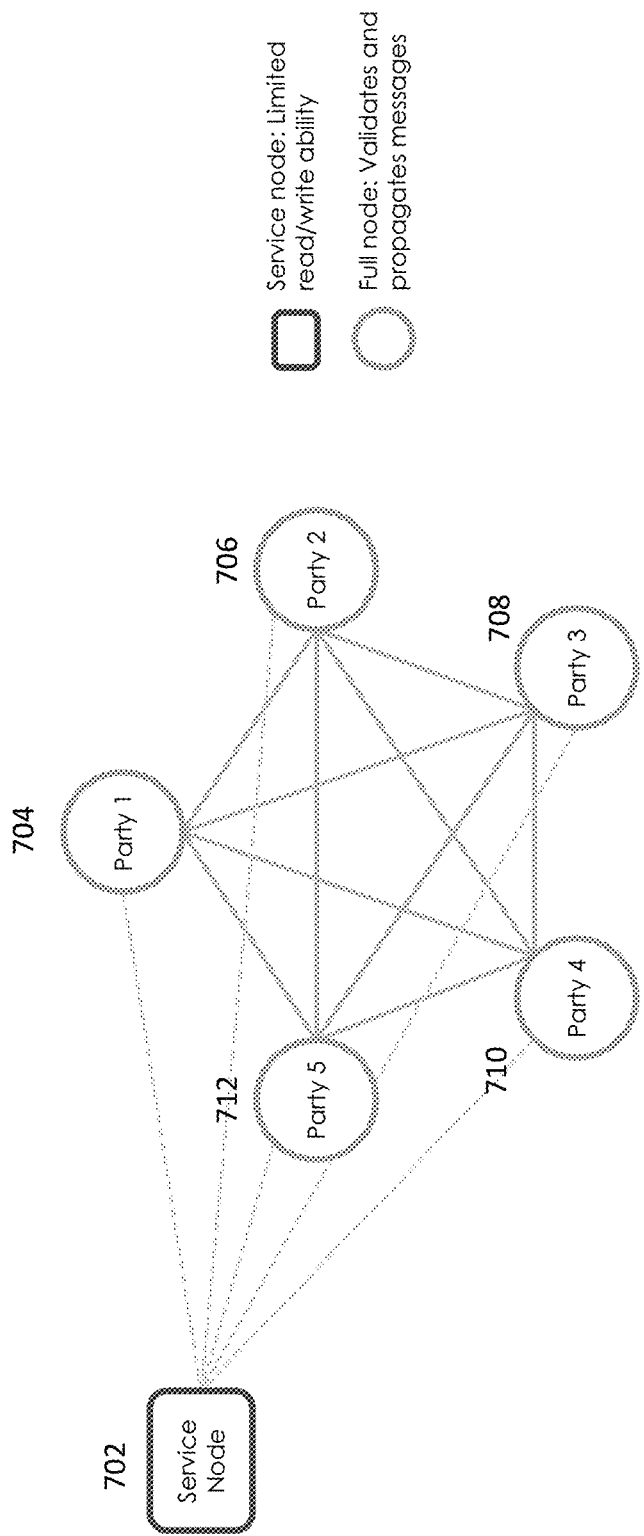
FIGS. 7A and 7B are diagrams showing a node sending information within a subspace accessible to another permissioned node, according to an embodiment of the invention.
Figure 7B:
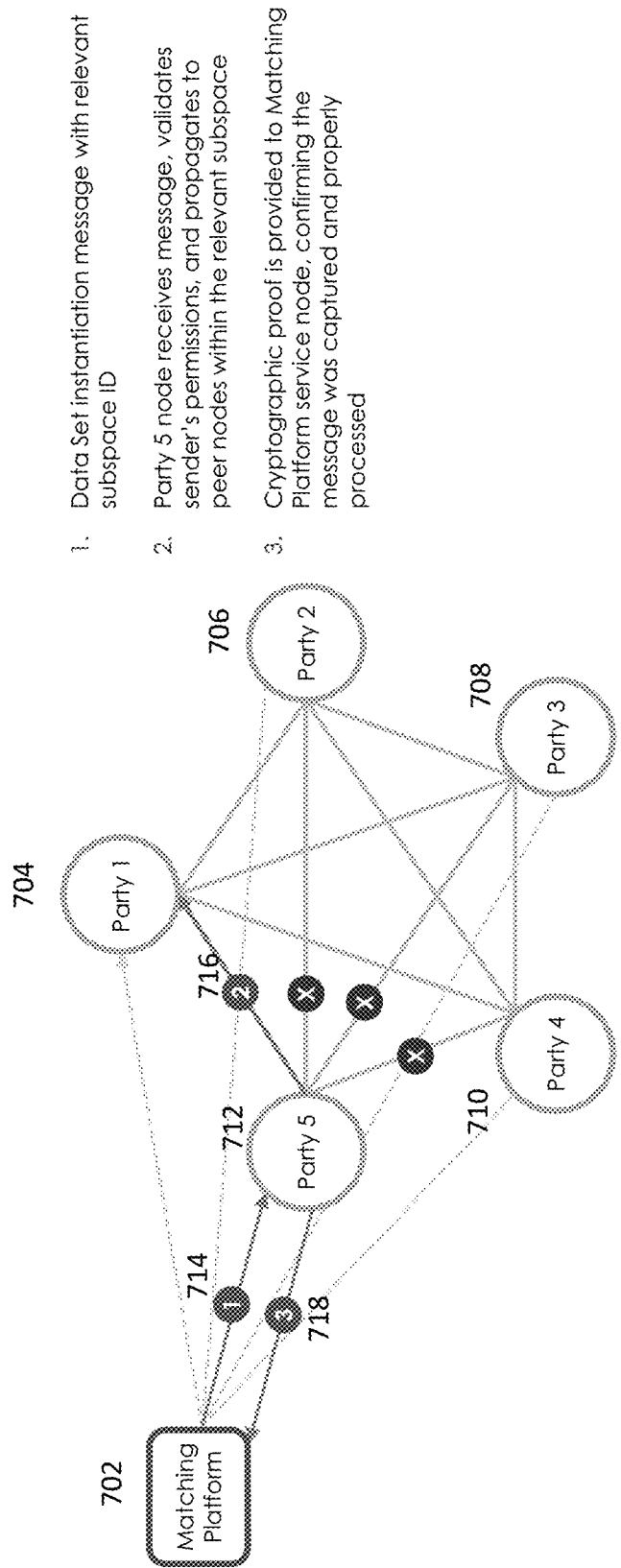

FIG. 6 provides an illustration through which a node with limited access and permissions, such as a service node, is able to engage in a trustless validation process. The service node 602 requests information concerning a data in a particular subspace, such as, for example, a specific smart contract 608. First, the service node 602 generates a request for the data 604 after establishing a secure connection with a server node 606 (which may be a peer node or validating node) thorough a TLS gateway 604. The server node 606 decrypts the request from service node 602 and processes the request by first checking 616 where the service node 602 has any level of permissions with respect to the requested subspace. To check permission 616, the server node 606 retrieves the privately subspaced blockchain with the relevant subspace, and then accesses the particular subspace 608 (e.g., the smart contract) to retrieve the list of nodes having a level of permission (peer, validating, service) with respect to that subspace 608. If the service node 602 is listed as having service/API permission for the particular subspace, then permission is approved 618. In this regard, it should be noted that the levels of permission are hierarchical, with validating nodes having greater permissions than peer nodes, and peer nodes having greater permissions than service/API nodes. As a result, lower level permissions are contained within higher level permissions, such that a node that has a higher level of permission will be approved for requests that require lower level permissions. For example, if a node is validating node for a particular subspace, it will be approved for requests for which validating, peer, or service/API permission is required. As another example, if a node is a peer node for a particular subspace, it will be approved for requests for which peer or service/API permission is required. The system may support additional levels of permission as needed. Having determined that the service node 602 has permission to access data in the particular subspace, the server node responds by returning validation data 622 from which the service node 602 can determine that the response is valid. For example, this validation data may be a version of the block 622 that contains the complete block header (including signature from the server node 606, message root, and state root), but excludes data from any subspaces for which the service node is not permissioned, and only contains data in the data payload from the relevant subspace for which the service node 602 is permissioned (e.g., the requested smart contract), or portions thereof, as well as the hash value or indexes 610 from the excluded data. Despite the fact that the service node returns a limited portion of the block, the service node is able to validate the data by evaluating the validation data by, for example, performing a proof on the hash tree to generate a root 612 and compare it to the state root in the block header to confirm that it generates an equivalent value for the state root. Where the state root is that of a Merkle tree, the service node 602 will perform a Merkle proof in order to verify the data returned by the server node 606.

Figure 15:
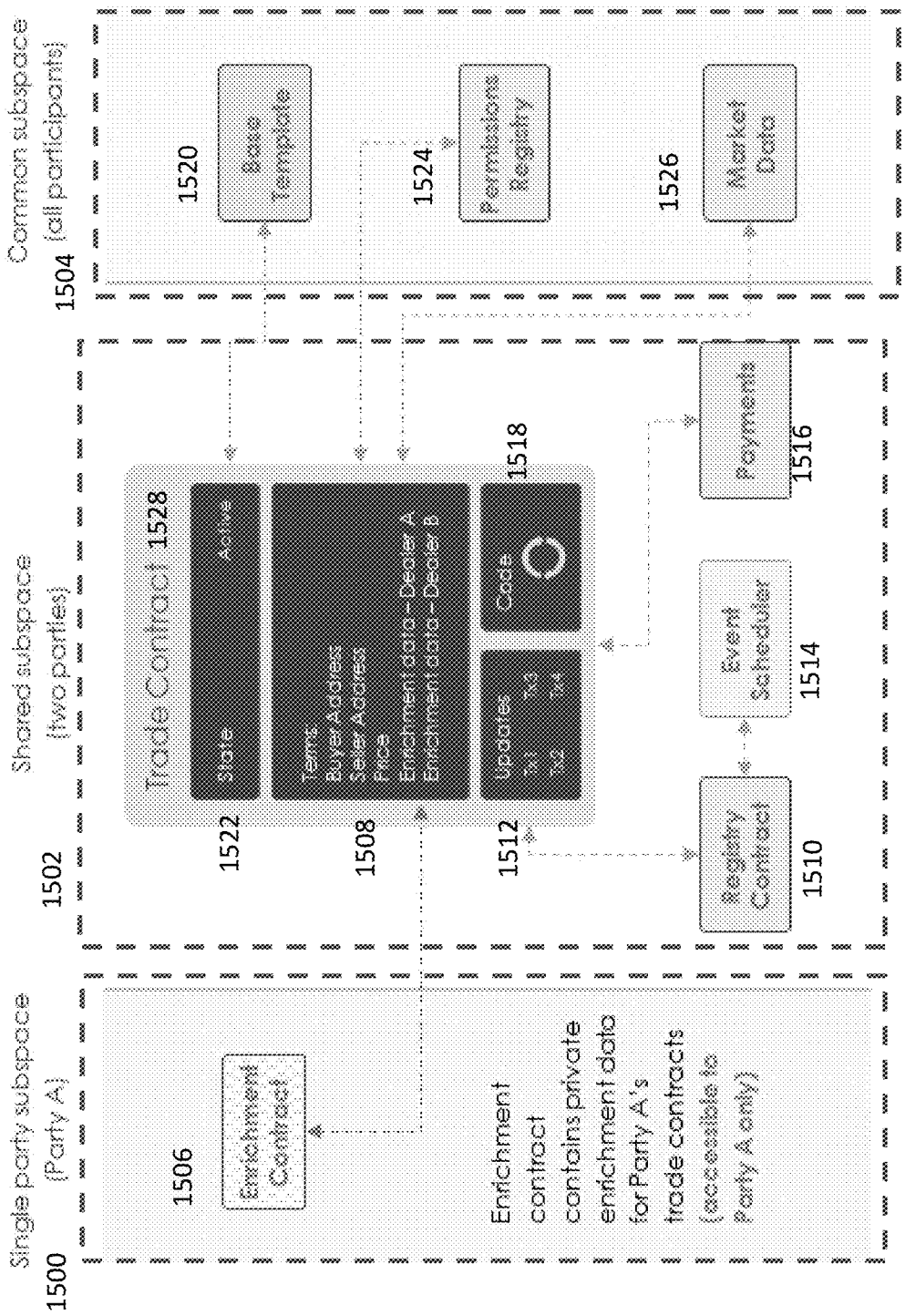
FIG. 15 is a diagram showing the components a smart contract and corresponding interactions of subspaces, according to an embodiment of the invention.

FIG. 15 provides an illustration of various smart contracts and the corresponding common and private subspaces by which participants in the network can store data and execute logic, through the use of the privately subspaced blockchains described above, and in a way such that certain data and logic are accessible only to those nodes with permission to access the subspace. The subspace 1500 is private to party A and contains an enrichment smart contract 1506. The 1506 smart contract stores party A's private data from its trade contracts. The common subspace 1504 contains market data, permissions registry and base template contracts. The base template contract 1520 contains rules and logic associated with financial contracts. The permissions registry contract 1524 maintains the permission list of parties in various privately subspaced blockchains. The market data contract 1526 provides input for executing the logic of smart contracts. The bilateral subspace 1502 contains a set of smart contracts that records the trade between two parties: Party A and Party B. The trade contract 1528 stores the current state of contract 1522, the terms of the particular trade 1508, the set of updates made to this trade 1512, and the bytecode 1518 for executing rules/logic of the trade contract. The subspace 1502 also contains a registry contract 1510 for storing all trade contracts, an event scheduler 1514 for tracking the timestamps within block headers and a payments smart contract 1516 to consolidate payments owned from trade contracts and calculates netted values. The enrichment data part of the trade contract terms 1508 is populated by both parties through the enrichment contract 1506 present in their own private subspace 1500. The trade contract 1528 itself is instantiated using the base template 1520 and populated with specific terms of the trade 1508. Permissions for the parties who can execute logic of the trade contract 1528 are managed through the registry contract 1524 in the common subspace.

Figure 16A:
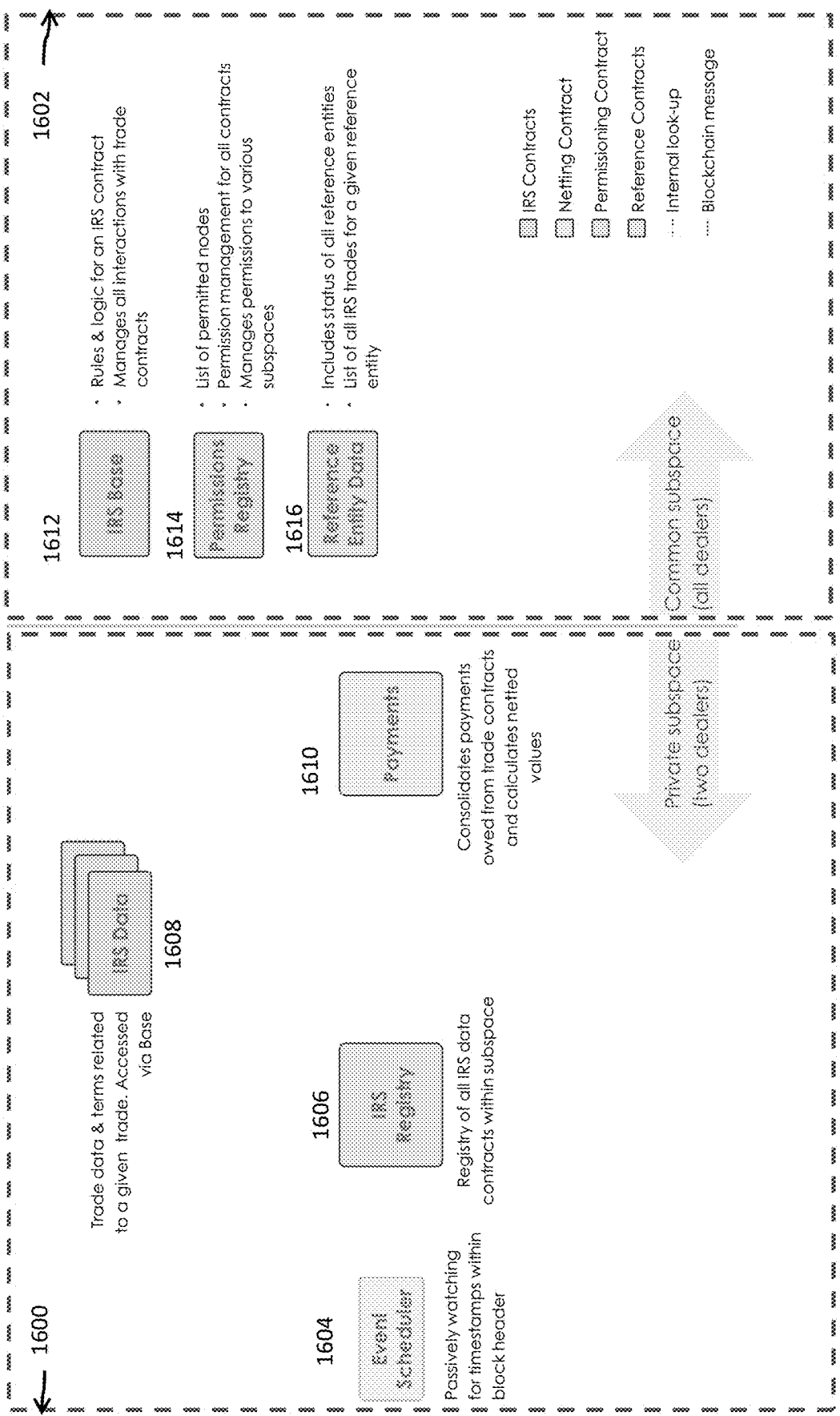
FIGS. 16A-E are diagrams showing an application of the Core Module, according to an embodiment of the invention.
Figure 16B:
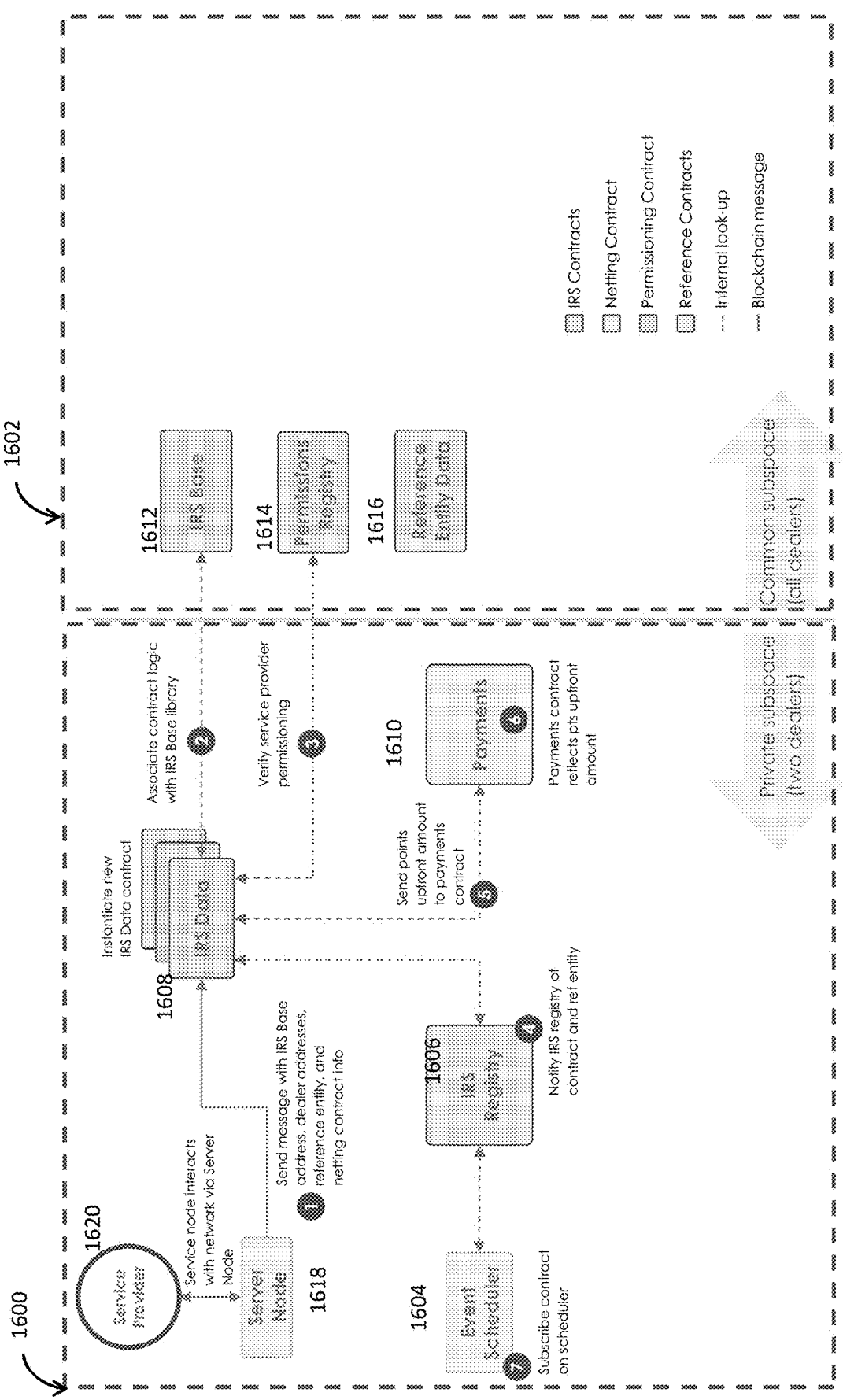
Figure 16C:
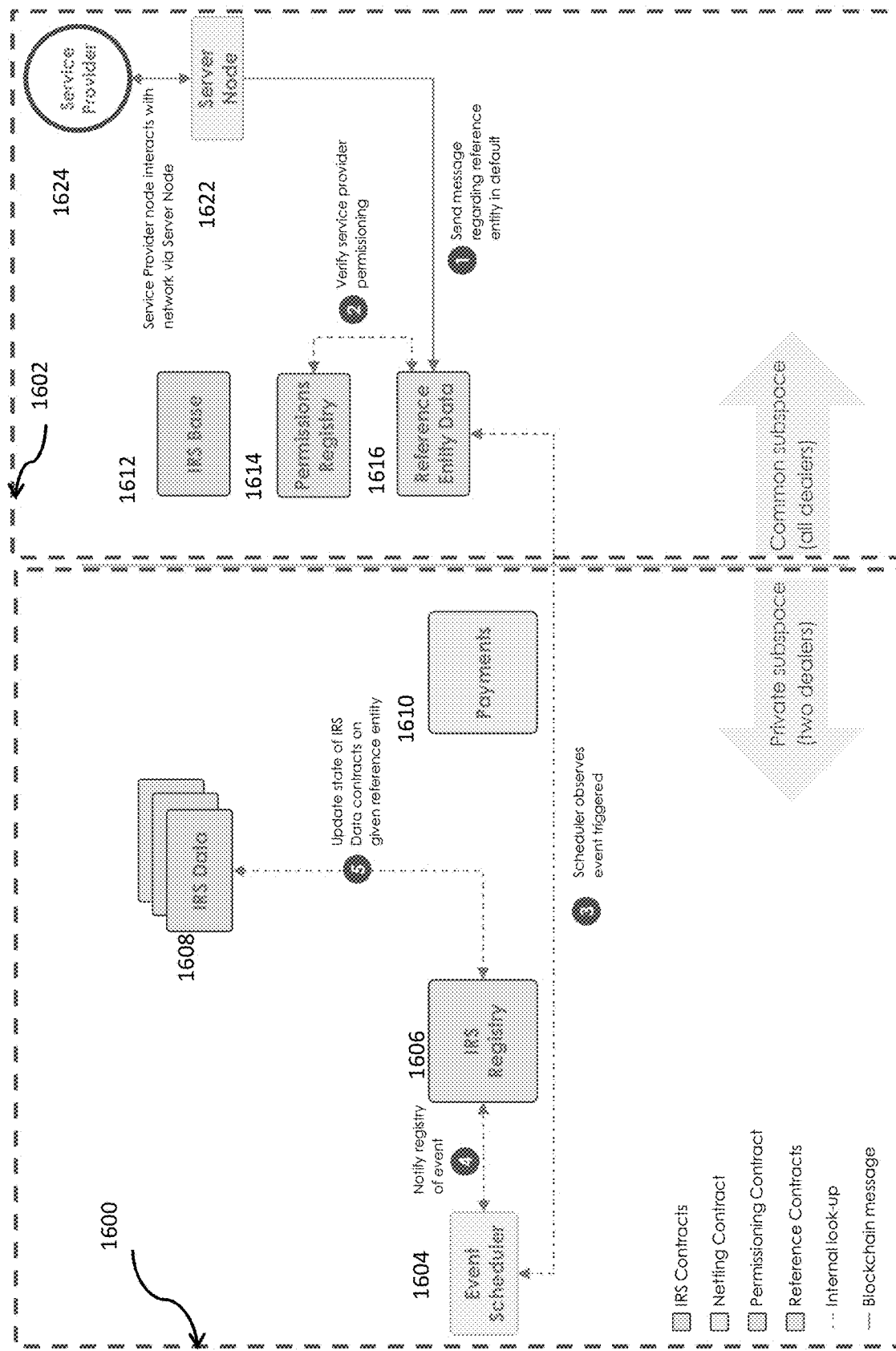
Figure 16D:
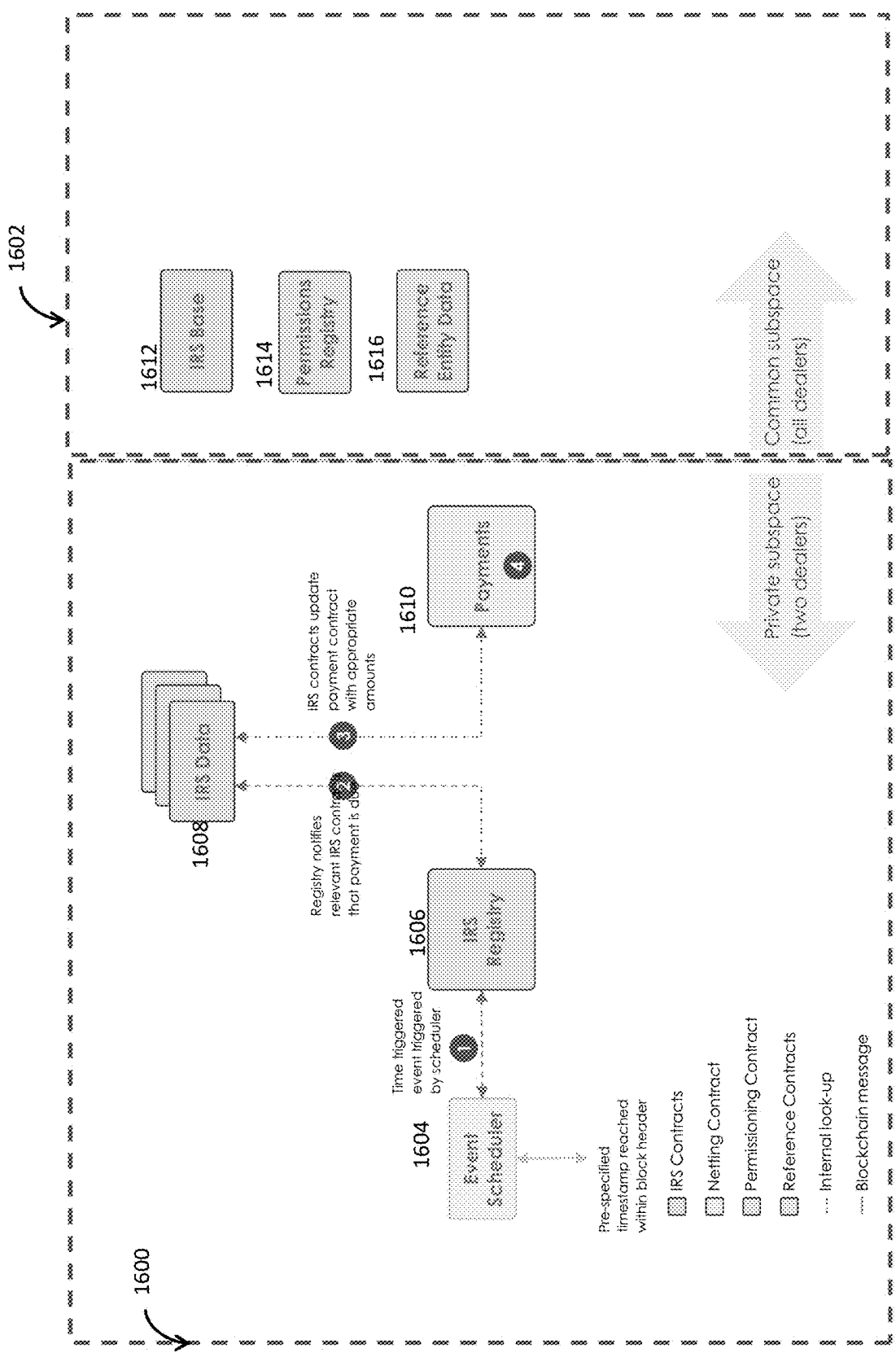
Figure 16E:
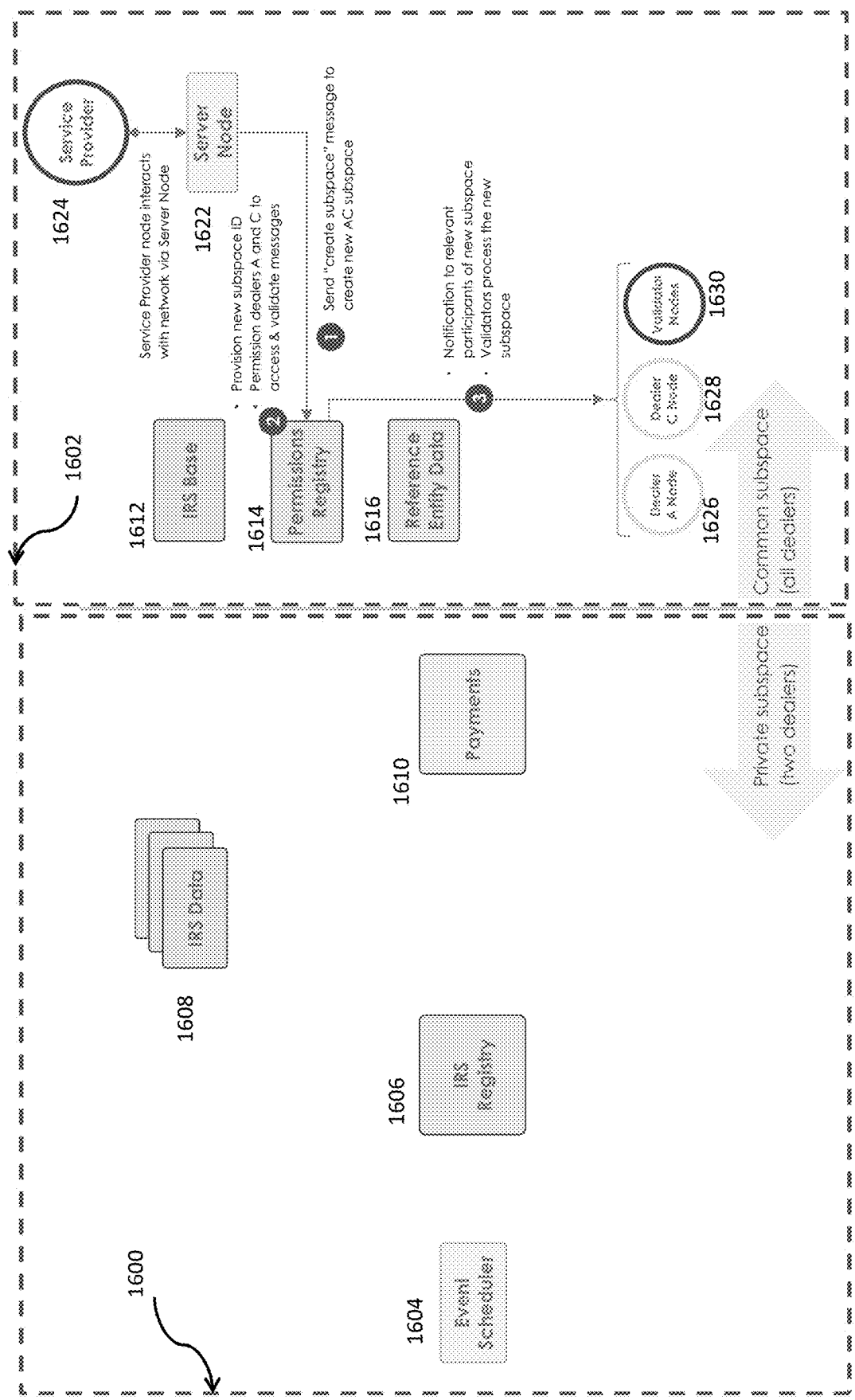

FIGS. 16A-E show various life cycle events of an Interest Rate Swap (IRS) contract implemented in privately subspaced blockchains, according to an embodiment. FIG. 16A shows the architecture of a IRS contract. Smart contracts used for implementing IRS reside in two subspaces: (1) The bilateral subspace 1600 between the parties, and (2) the common subspace 1602. The IRS Data contract 1608 contains the trade terms, the registry contract 1606 maintains IRS instances and the payments contract 1610 is used for consolidating payments and netting. The common subspace 1602 contains three contracts which are used in execution of IRS. The base contract 1612 is a template for IRS contract, the permissions registry contract 1614 manages the permissions of parties across subspaces, and the reference data contract 1616 maintains public reference data. FIG. 16B shows the sequence of events during the creation of a new IRS. The matching engine 1620 interacts with a server node 1618 in the bilateral subspace 1600 to initiate the recording of a trade on a privately subspaced blockchain. The server node accesses the base template contract 1612 from the common subspace to instantiate a new IRS contract 1608. The service provider permissions are validated by accessing the registry contract 1614. Upon verifying the credentials, the new contract is stored in the registry 1606 and the upfront amounts are sent to the payments contract 1610. The new contract is also added to the scheduler contract 1604 for tracking the block header timestamps. FIG. 16C shows the sequence of events that result in an update of IRS contract in the bilateral subspace 1600. The clearing house node 1624 connects to a server node 1622 in the common subspace 1602. The server node sends a message to the reference data contact 1616. The event scheduler 1604 on the bilateral subspace observes this message and notifies the IRS registry contract 1606. The registry contract then updates the state of underlying IRS contract 1608. FIG. 16D illustrates the sequence of events following a time based trigger. Upon reaching a pre-defined timestamp, the event scheduler 1604 triggers a time triggered event by notifying the IRS registry 1606. The registry notifies the underlying IRS contract 1608 and the payments in the contract are updated appropriately in the payments contract 1610. FIG. 16E shows the creation of a new bilateral subspace. The clearing node 1624 sends a message to server node 1622 to create a new bilateral privately subspaced blockchain. The permissions registry contract 1614 verifies the permissions and creates a new bilateral subspace and also sends a notification to the relevant nodes from both parties.

Figure 17A:
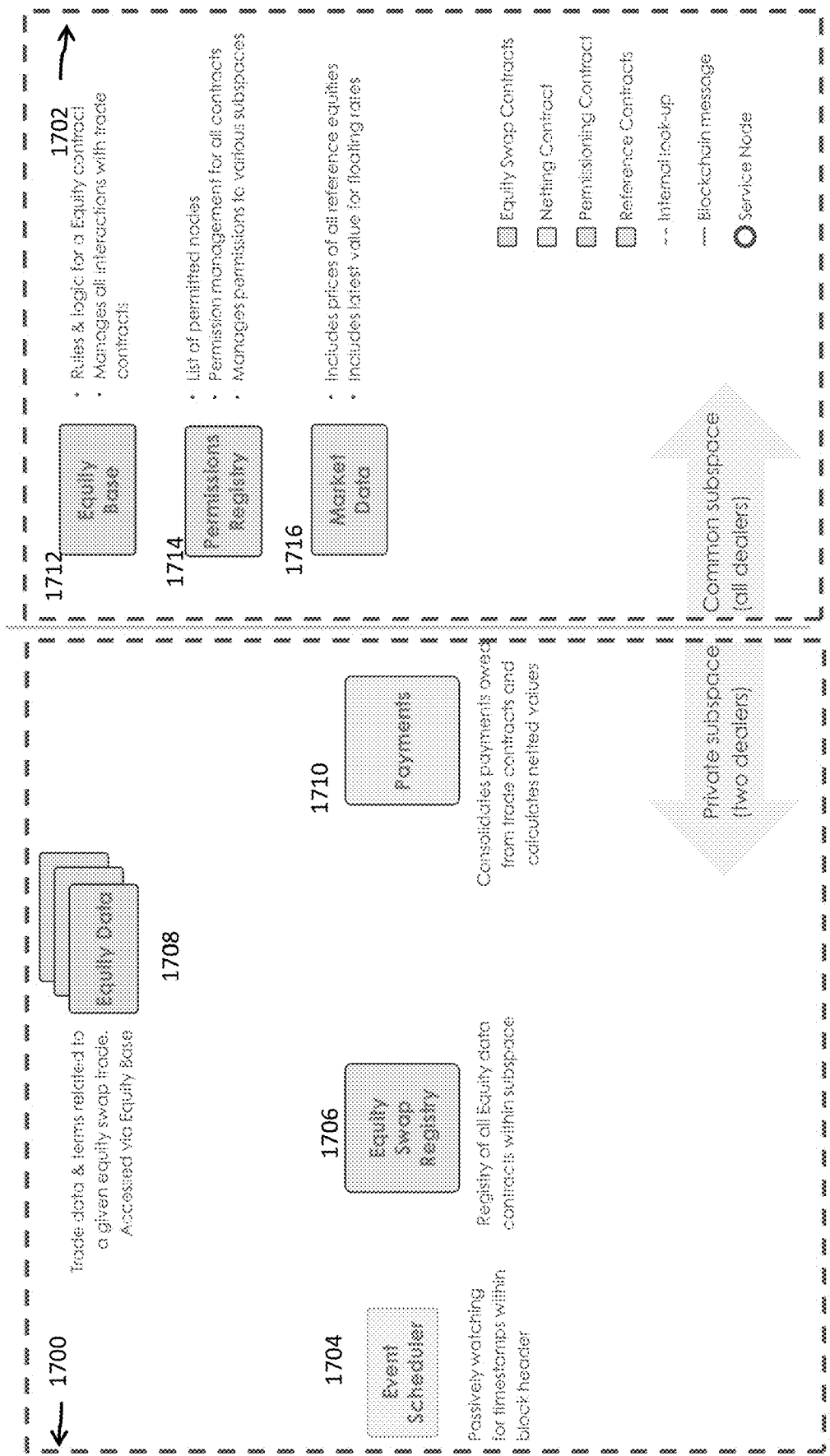
FIGS. 17A-C are diagrams showing another application of the Core Module, according to an embodiment of the invention.
Figure 17B:
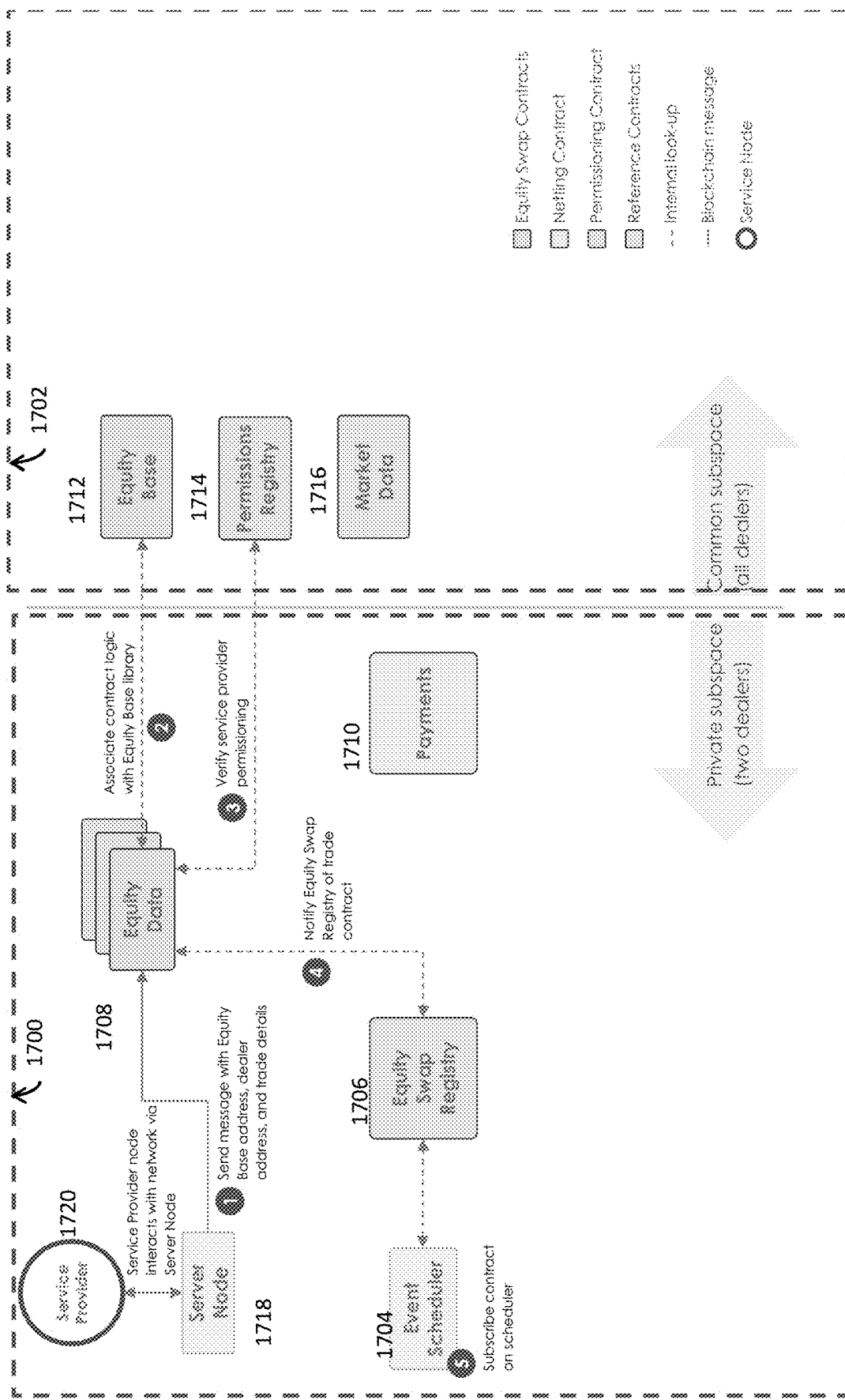
Figure 17C:
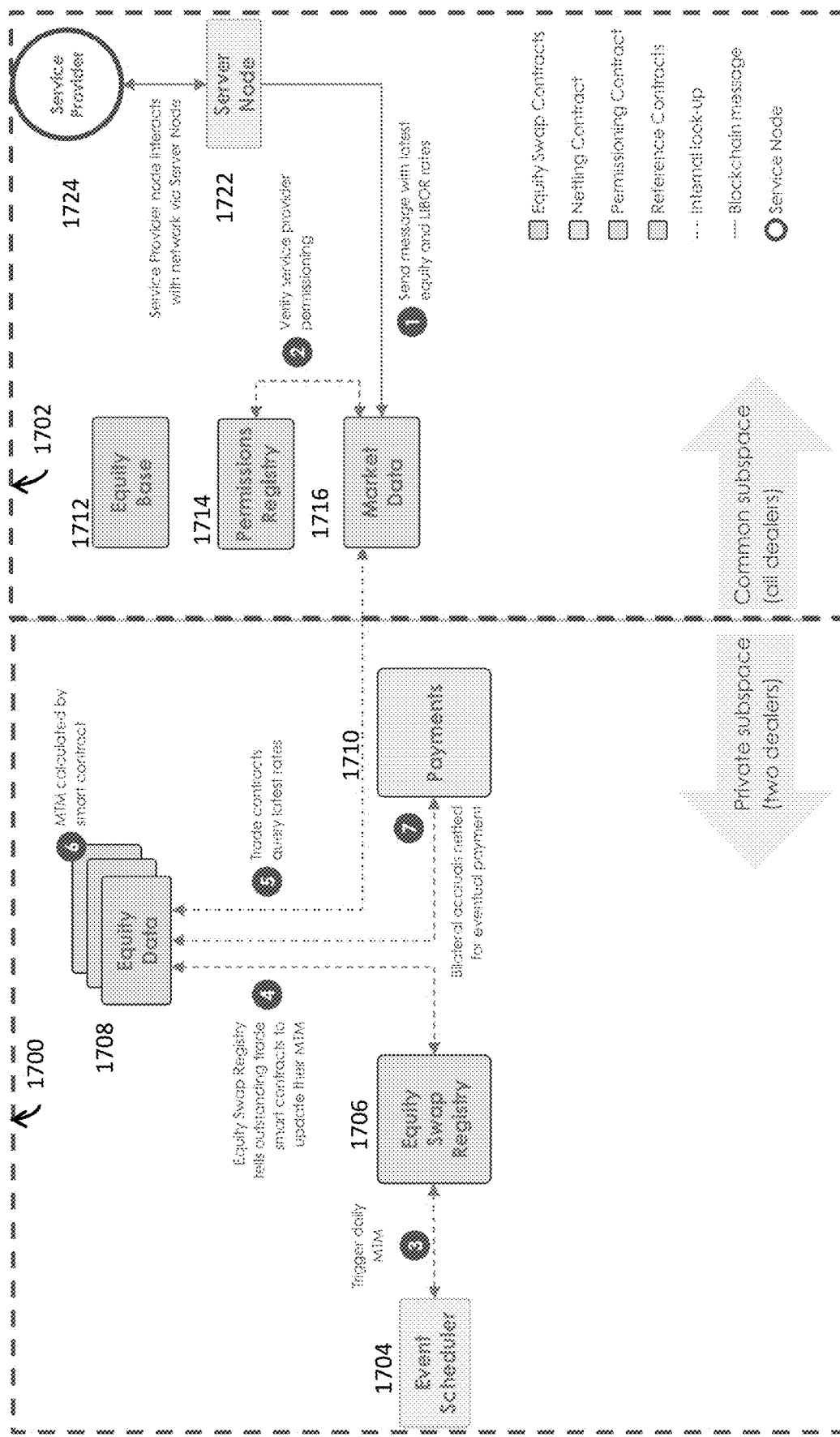

FIGS. 17A-C illustrate the creation of an Equity Swap contract, according to an embodiment. FIG. 17A shows the required contracts in both private subspace 1700 and the common subspace 1702. The common subspace contains the base template contract 1712, the permissions registry 1714 and the market data contract 1716. The bilateral subspace 1700 between the parties contains the Equity Swap contract 1708, a payments contract 1710, a registry contract 1706, and an event scheduler contract 1704. FIG. 17B illustrates the creation a new Equity swap contract in the bilateral subspace 1700. The Market node 1720 interacts with the server node 1718 to initiate the creation of a new trade contract. The server node creates a blockchain message to create a swap contract 1708 from the template defined in the base contract 1712. Upon the creation of swap contract, the registry contract 1706 and the scheduler contract 1704 are updated. FIG. 17C illustrates the sequence of events during the end of day updates of the payment between the parties. A market data provider 1724 connects to server node 1722 in the common subspace. The server node updates the market data contract 1716 by sending a message. The event scheduler contract 1704 in the bilateral subspace triggers a mark to market (MTM) event that fetches the outstanding contracts from the registry 1706. The outstanding trade contract 1708 queries the market data contract 1716 for latest interest rates, calculates MTM and eventually sends a message to the payments contract 1710.

Figure 18:
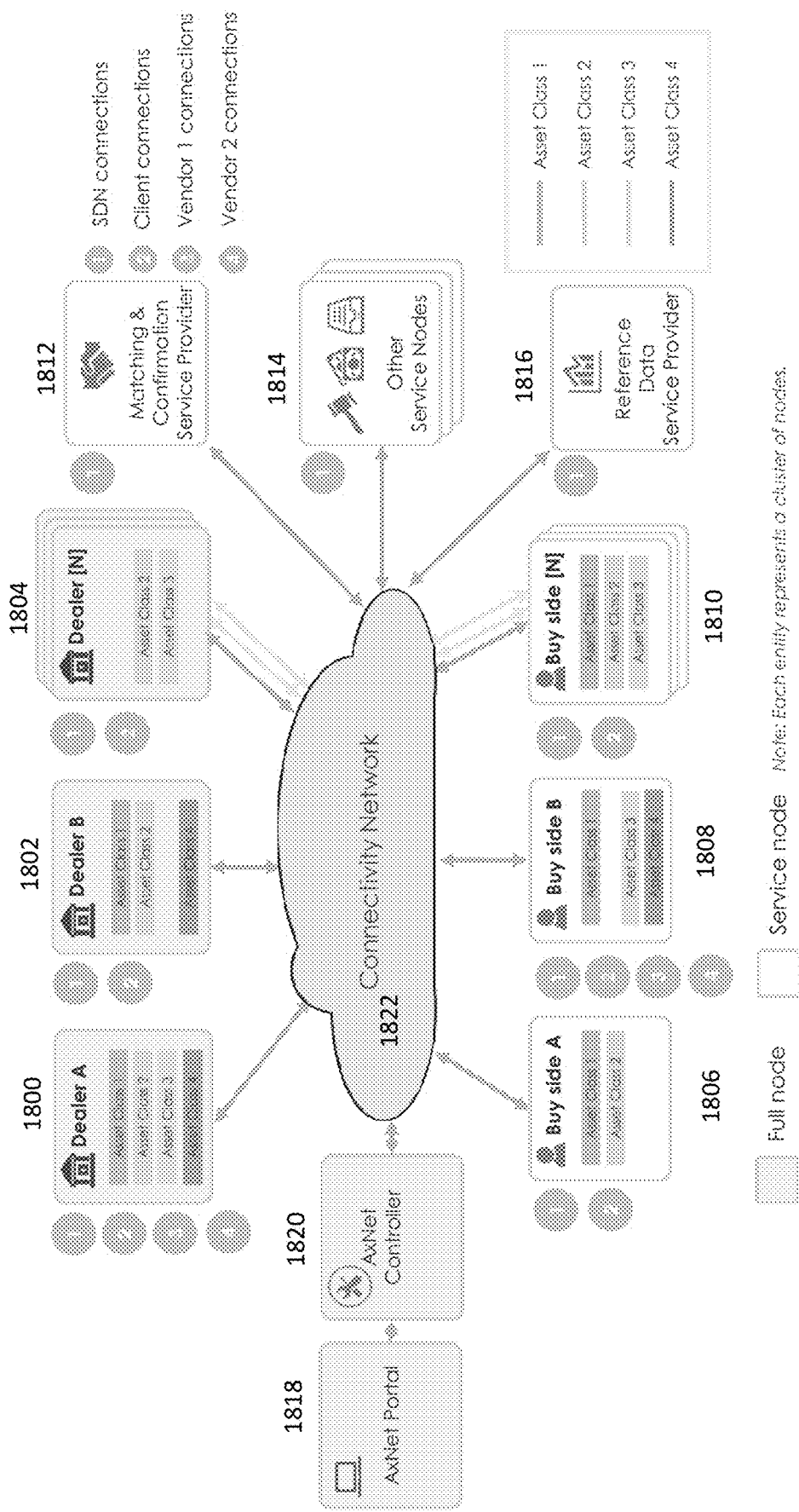
FIG. 18 is a diagram showing an application of the system using ongoing rights management with automated physical connections and contract permissions, according to an embodiment of the invention.

FIG. 18 shows how the reference data providers 1816, confirmation service providers 1812 and other nodes interact through a common connectivity network 1822. Buy side firms, dealers and other service providers maintain different connections to the network. The matching and confirmation service provider 1812, the reference data provider 1816 and other service providers 1814 only maintain a software defined networking (SDN) based connection to the network. These three services only have service level nodes and hence have limited visibility into the network. These nodes have access only to a limited set of contracts within specific subspaces. They also receive all messages in the common subspace. The dealer node 1800 is a full node which implies that it receives all messages in its permissioned subspace(s) and also commits blocks to the subspace blockchain. It maintains client and vendor connections to the network 1822. The dealer nodes 1802 and 1804 are also full nodes and maintain SDN and client connections to the network. The buy side nodes 1806, 1808 and 1810 are service nodes and access to limited set of messages in permissioned subspaces.

While the invention has been described in terms of several preferred embodiments, it should be understood that there are many alterations, permutations, and equivalents that fall within the scope of this invention. It should also be noted that there are alternative ways of implementing both the process and apparatus of the present invention. For example, steps do not necessarily need to occur in the orders shown in the accompanying figures, and may be rearranged as appropriate. It is therefore intended that the appended claim includes all such alterations, permutations, and equivalents as fall within the true spirit and scope of the present invention.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, microprocessors, and any one or more processors of any high performance digital computing platform. A processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context

We claim:

1. A computer system, comprising:
    at least one memory device containing instructions; and
    at least one processor executing the instructions to perform operations comprising:
    receiving, at an application programming interface, a request to change a permission of a first node to access a first portion of a data structure;
    calling, based on the request, a function to set the first node to be permissioned to access the first portion of the data structure;
    receiving a first state root value from the first node that is permissioned to access the first portion of the data structure, wherein:
        the data structure comprises a plurality of entries,
        an entry representation value of a respective entry of the plurality of entries links the plurality of entries to form the data structure, and
        the first state root value includes a first representation value of data associated with the first portion of the data structure;
    generating a global state root value based on a second representation value of data including the first state root value;
    updating a second portion of the data structure based on the global state root value, wherein the first node and the at least one processor are permissioned access to the second portion of the data structure, and the at least one processor is not permissioned access to the first portion of the data structure;
    storing the updated data structure;
    receiving a request to validate the updated data structure including the first portion and the updated second portion; and
    validating the updated data structure based on the first state root value and the global root value without the at least one processor accessing entries in the first portion of the data structure.

2. The computer system of claim 1, wherein the operations further comprise:
    receiving a second state root value from a second node that is permissioned to access a third portion of the data structure, wherein the second state root value includes a third representation value of data associated with the third portion of the data structure, wherein the generating the global state root value is based on the second state root value.

3. The computer system of claim 2, wherein the at least one processor is not permissioned access to the third portion of the data structure.

4. The computer system of claim 2, wherein the first node is not permissioned access to the third portion of the data structure.

5. The computer system of claim 2, wherein the second node is permissioned access to the second portion of the data structure and not permissioned access to the first portion of the data structure.

6. The computer system of claim 1, wherein a header of the second portion of the data structure comprises a cryptographic signature, and wherein the operations further comprise validating the data structure based on the cryptographic signature.

7. The computer system of claim 1, wherein the entry representation value, the first representation value, and the second representation value each include a respective cryptographic hash.

8. The computer system of claim 1, wherein the operations further comprise:

receiving a message to update a third portion of the data structure, the third portion of the data structure storing third portion data, wherein the at least one processor is permission access to the third portion of the data structure and the first node is not permissioned access to the third portion of the data structure; and generating a second state root value based on the third portion data, wherein the generating of the global state root value is based on a third representation value of the second state root value.

9. The computer system of claim 8, wherein the operations further comprise:

receiving a request to access the third portion of the data structure;

determining that the at least one processor is permissioned to access the third portion of the data structure;

accessing the third portion data from the third portion of the data structure; and providing the third portion data in response to the request.

10. The computer system of claim 1, wherein the operations further comprise:

generating a new entry using the global state root value, the first state root value, and the data associated with the first portion of the data structure on which the first state root value is based; and updating the data structure with the new entry.

11. The computer system of claim 10, wherein the at least one processor is selected to generate the new entry via a selection process.

12. The computer system of claim 10, wherein the data structure is updated with the new entry in response to receiving, from a plurality of follower nodes, approval of the new entry.

13. The computer system of claim 10, wherein the first portion of the data structure is updated when the data structure is updated with the new entry.

14. The computer system of claim 1, wherein the operations further comprise:

receiving a request to access the first portion of the data structure;

determining that the at least one processor is not permissioned to access the first portion of the data structure; and providing a response that the request to access the first portion of the data structure failed.

15. The computer system of claim 1, wherein the first node is permissioned to access the first portion of the data structure based on information stored in the second portion of the data structure.

16. The computer system of claim 1, wherein the operations to validate the data structure further comprise:

validating an entry including a portion of the first portion of the data structure for which the at least one processor is not permissioned to access based on the first state root value and the global root value, wherein:

the state root value and the global root value are generated based on the portion of the first portion of the data structure which the at least one processor is not permissioned to access.

17. The computer system of claim 1, wherein the operations further comprise:

receiving a request to change a permission of the first node at the application programming interface, and calling a function based on reception of the request to change the permission of the first node, wherein calling the function comprises setting the first node to be permissioned to access the second portion of the data structure prior to the updating of the second portion of the data structure.

18. The computer system of claim 1, wherein the operations further comprise steps for generating the global state root value.

19. The computer system of claim 1, wherein the operations further comprise steps for pruning the data structure.

20. A computer-implemented method, comprising:

receiving, at an application programming interface, a request to change a permission of a first node to access a first portion of a data structure;

calling, based on the request, a function to set the first node to be permissioned to access the first portion of the data structure;

receiving, with one or more processors, a first state root value from the first node that is permissioned to access the first portion of the data structure, wherein:

the data structure that comprises a plurality of entries, an entry representation value of a respective entry of the plurality of entries links the plurality of entries to form the data structure, and the first state root value includes a first representation value of data associated with the first portion of the data structure;

generating, with one or more processors, a global state root value based on a second representation value of data including the first state root value;

updating, with one or more processors, a second portion of the data structure based on the global state root value, wherein the first node and at least one processor are permissioned access to the second portion of the data structure, and the at least one processor is not permissioned access to the first portion of the data structure;

storing, with one or more processors, the updated data structure;

receiving, with one or more processors, a request to validate the updated data structure including the first portion and the updated second portion; and validating, with one or more processors, the updated data structure based on the first state root value and the global root value without the at least one processor accessing entries in the first portion of the data structure.

* * * * *